United States Patent [19]

Hirasawa et al.

[11] Patent Number: 5,387,960
[45] Date of Patent: Feb. 7, 1995

[54] CAMERA APPARATUS

[75] Inventors: Masahide Hirasawa; Masamichi Toyama; Ryunosuke Iijima, all of Kanagawa, Japan

[73] Assignee: Canon Kabushiki Kaisha, Tokyo, Japan

[21] Appl. No.: 150,533

[22] Filed: Nov. 9, 1993

Related U.S. Application Data

[63] Continuation of Ser. No. 29,924, Mar. 11, 1993, abandoned, which is a continuation of Ser. No. 475,750, Feb. 6, 1990, abandoned.

[30] Foreign Application Priority Data

Feb. 9, 1989 [JP] Japan ............................ 1-30588
Feb. 9, 1989 [JP] Japan ............................ 1-32390

[51] Int. Cl.⁶ ........................................ G03B 13/00
[52] U.S. Cl. ................................ 354/402; 348/345
[58] Field of Search .......................... 354/400–409, 354/412, 286; 358/227, 228, 909

[56] References Cited

U.S. PATENT DOCUMENTS

| | | | |
|---|---|---|---|
| 4,763,196 | 8/1988 | Sakai | 358/213.13 |
| 4,782,355 | 11/1988 | Sakai et al. | 358/909 |
| 5,003,399 | 3/1991 | Ishimaru et al. | 358/209 |
| 5,040,068 | 8/1991 | Parulski et al. | 358/909 |

*Primary Examiner*—David M. Gray
*Attorney, Agent, or Firm*—Robin, Blecker, Daley & Driscoll

[57] ABSTRACT

A camera system having a lens unit provided with an actuator for changing the state of an optical system by driving a driving part and a driving circuit which drives the actuator on the basis of a driving control instruction signal supplied in a given periodicity from a control circuit disposed on the side of a camera body. The lens unit is characterized in that the actuator driving timing of the driving circuit is arranged to differ from the timing at which the driving control instruction signal is supplied from the control circuit to the driving circuit.

42 Claims, 17 Drawing Sheets

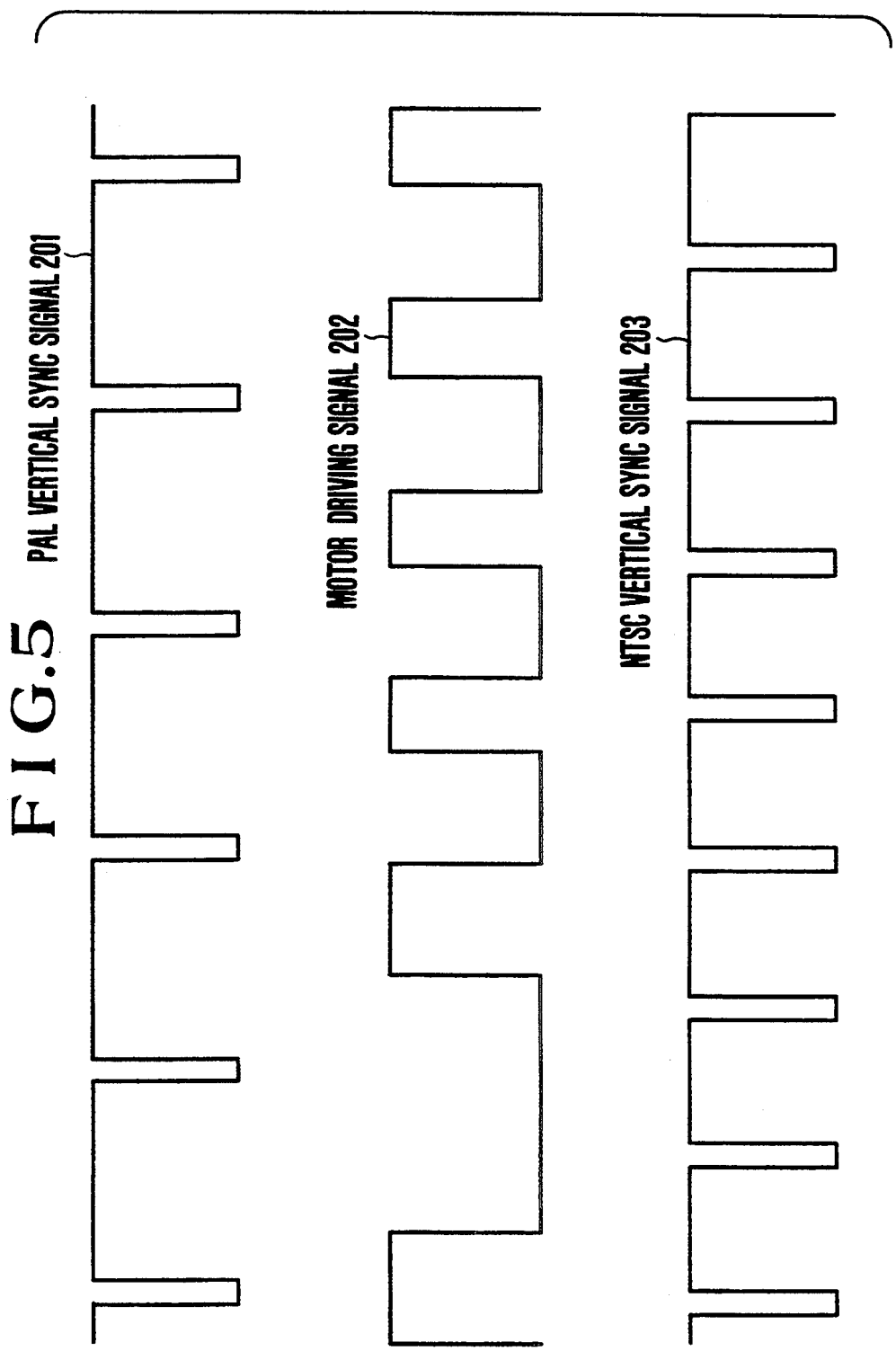

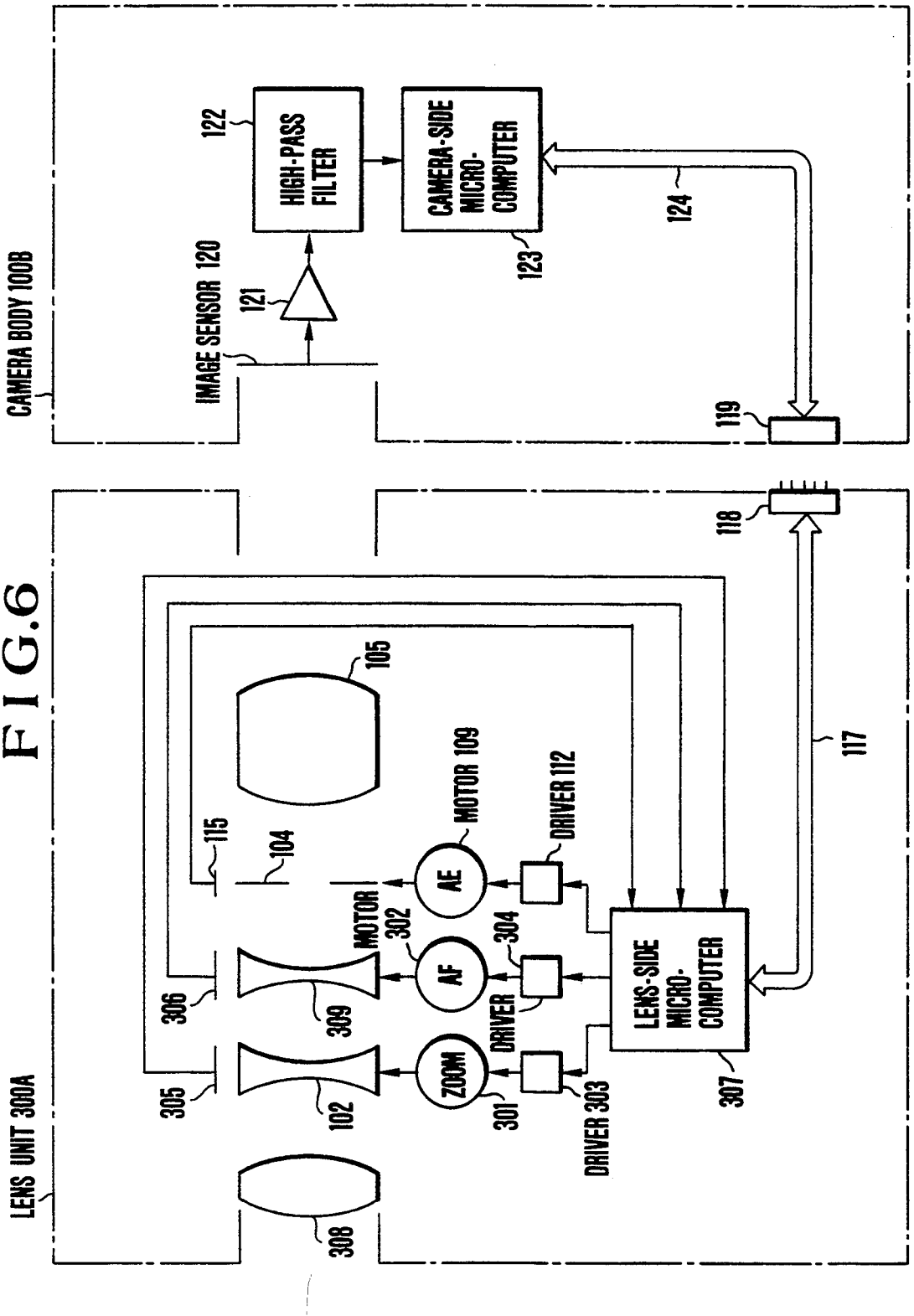

FIG. 7(a)    PAL Vsync 201
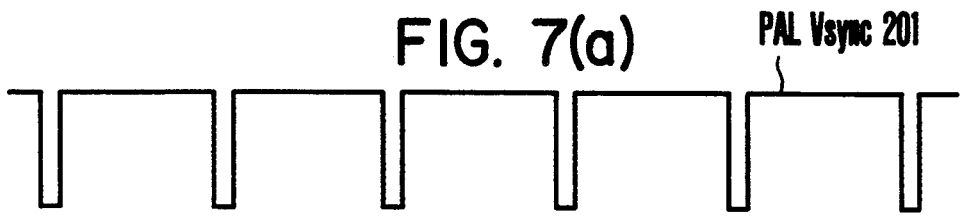
FIG. 7(b)    NTSC Vsync 203
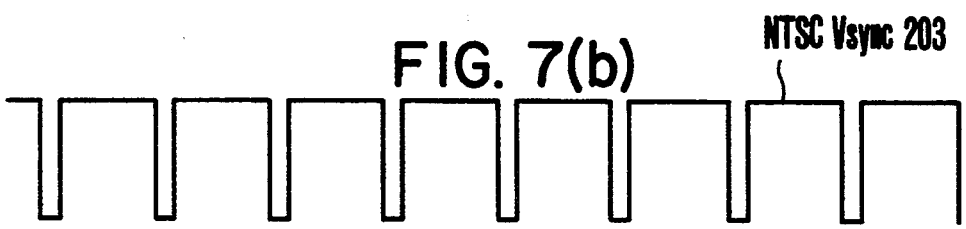
FIG. 7(c)    401
MOTOR DRIVING SIGNAL    FIG. 7(d)    402
FIG. 7(e)    403
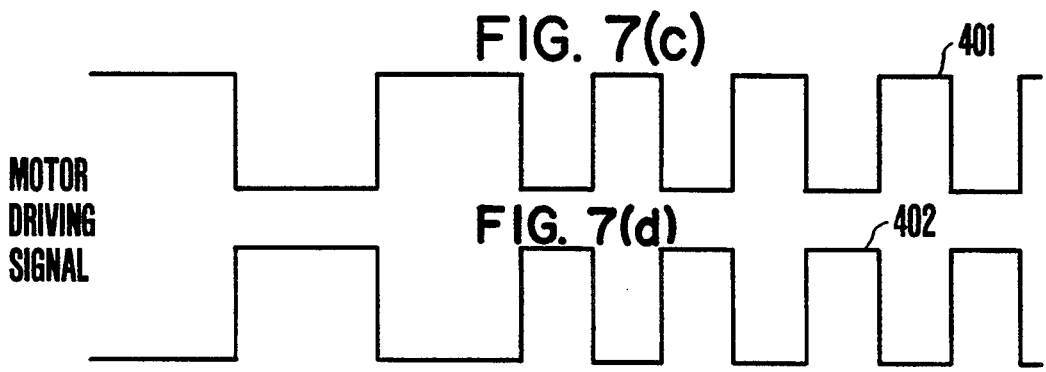
   404
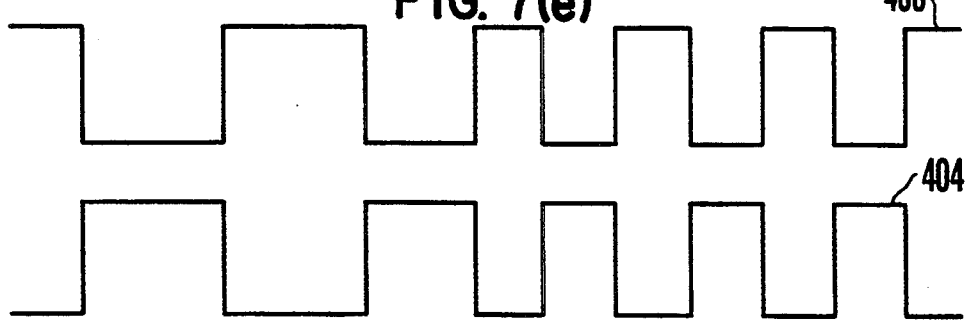
FIG. 7(f)

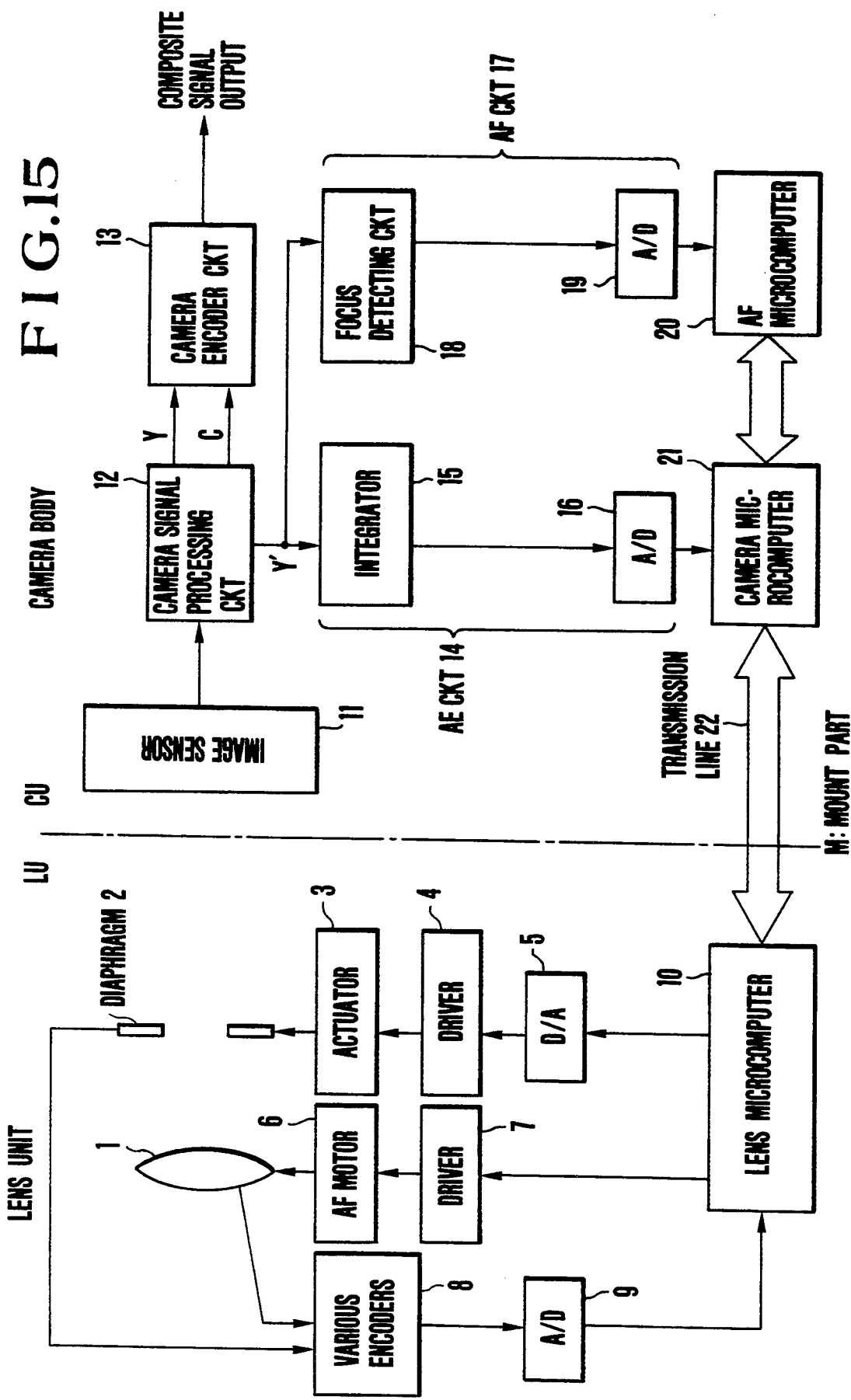

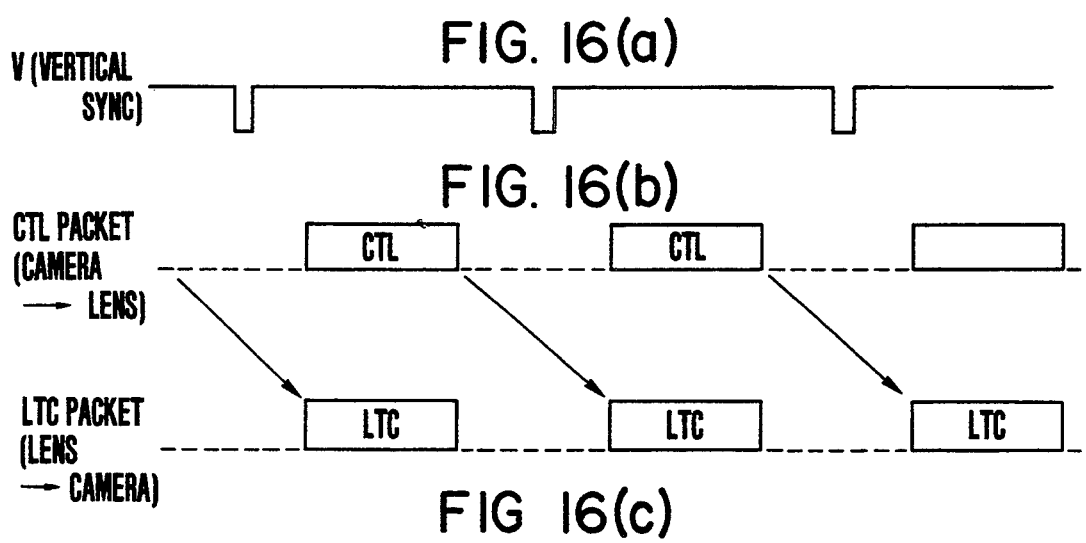
FIG. 16(a)
FIG. 16(b)
FIG. 16(c)
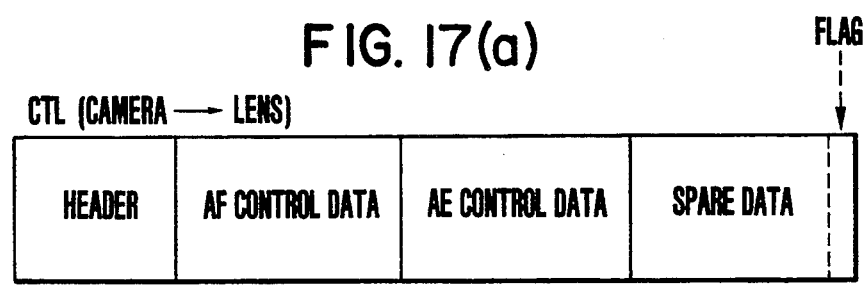
FIG. 17(a)
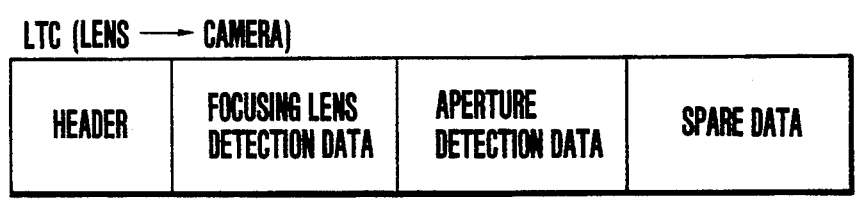
FIG. 17(b)

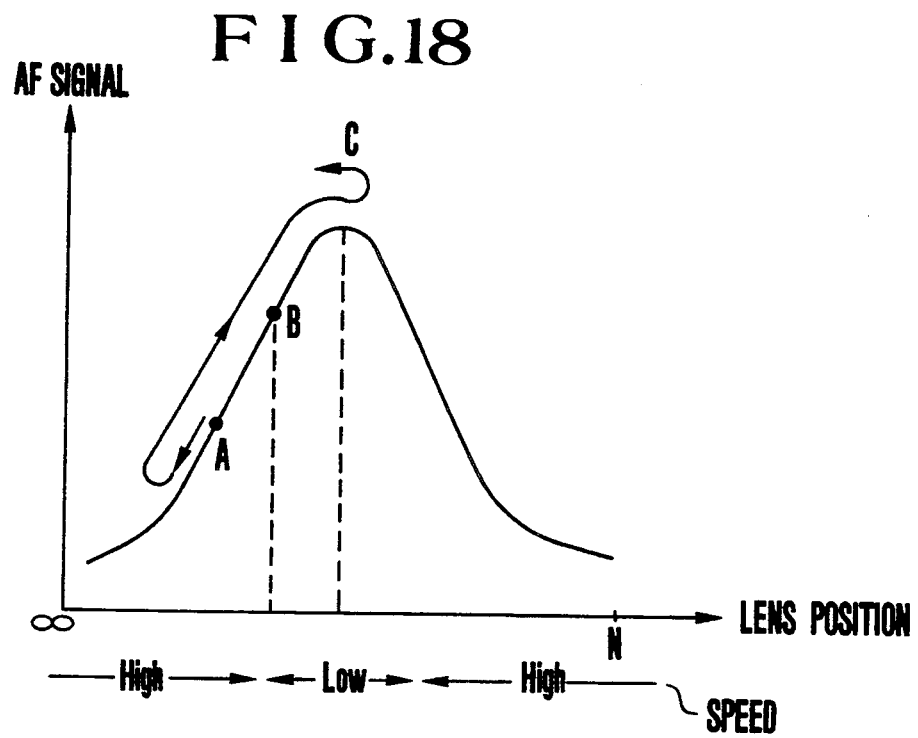
FIG.18
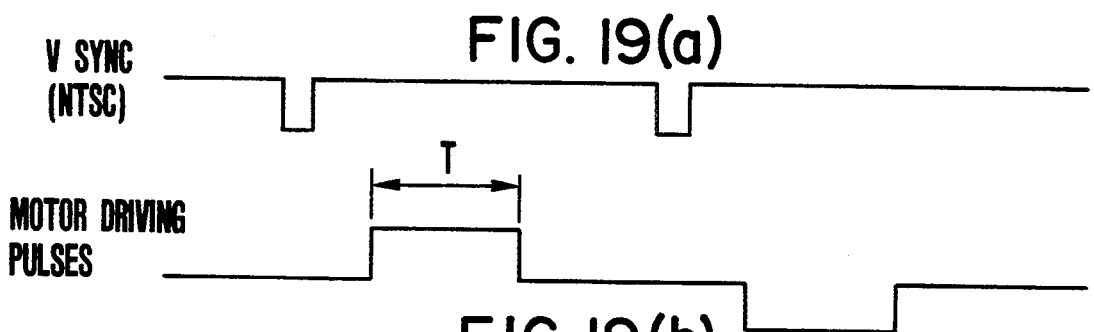
FIG. 19(a)
FIG. 19(b)
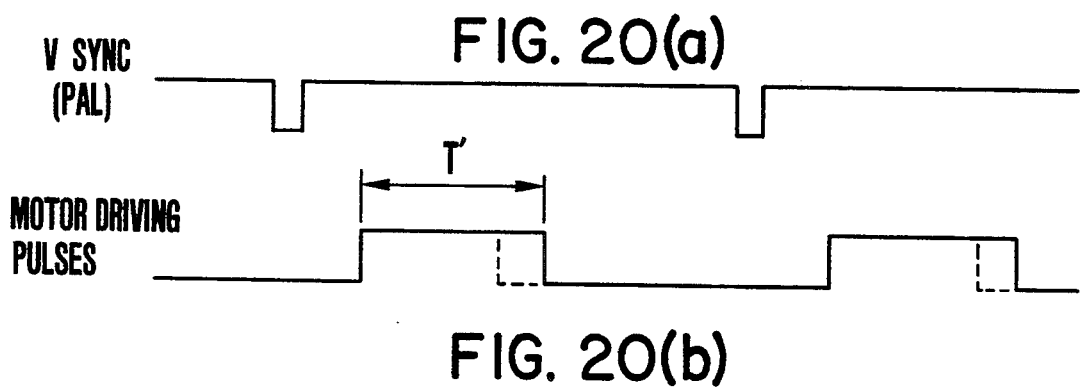
FIG. 20(a)
FIG. 20(b)

SPEED LOOK-UP TABLE

| SPEED DATA | T (ON-TIME) |
|---|---|
| $V_{16}$ | 16.7msec |
| $V_{15}$ | 15.0msec |
| $V_{14}$ | 14.0msec |
| ⋮ | ⋮ |
| $V_2$ | 2.0msec |
| $V_1$ | 1.0msec |

CAMERA APPARATUS

This is a continuation application under 37 CFR 1.62 of prior application Ser. No. 08/029,924, filed Mar. 11, 1993, which is a continuation application under 37 CFR 1.62 of prior application Ser. No. 475,750, filed Feb. 6, 1990, now abandoned.

BACKGROUND OF THE INVENTION

1. Field of the Invention

This invention relates to a camera which is advantageously adapted to a camera system having an automatic focusing (hereinafter referred to as AF) device.

2. Description of the Related Art

The technology in the field of picture taking apparatuses such as cameras and others has recently advanced to a conspicuous extent. As a result, the video cameras and the like have come to be equipped with automatic focusing devices, automatic exposure control devices, etc., in general.

FIG. 1 of the accompanying drawings shows in a block diagram and by way of example the arrangement of a so-called passive type automatic focusing (AF) device. The passive type AF device is arranged to detect the focused state of an optical system from an image signal obtained by photo-electric converting an object's image which is formed through the optical system.

Referring to FIG. 1, a first lens group 101 is provided for focus adjustment. A second lens group 102 is provided for zooming. A third lens group 103 is provided for correcting a change in a focal point resulting from zooming. A fourth lens group 105 serves as an image forming system. The illustration includes an image sensor 120; an amplifier 121 which is arranged to amplify a signal output from the image sensor 120; a high-pass filter 122; and a microcomputer 123 (hereinafter referred to as AF microcomputer) which is arranged to perform AF control and to produce instructions for driving a motor. A driver 110 is arranged to supply a motor 107 with energy in accordance with the instruction of the AF microcomputer 123. The motor 107 is arranged to shift the position of the focusing lens group 101 under the control of the driver 110. A transmission line 1201 is provided for transmitting the instruction of the AF microcomputer 123. A boundary line 1202 indicates a boundary between a camera part and a lens part.

In the passive type AF system which is arranged as shown in FIG. 1, an image which has passed through an optical system is first converted into an electrical image signal by the image sensor 120. The electrical signal is amplified by the amplifier 121. The amplified image (or video) signal is supplied to the high-pass filter 122. At the high-pass filter 122, a high-frequency component of the image signal which is related to focusing within the signal is alone taken out. The high-frequency component thus taken out is supplied to the AF microcomputer 123. It is known that the high-frequency component of an image or video signal generally increases its level accordingly as the optical system is adjusted closer to an in-focus position. The relation of the high-frequency component to the focusing lens position of the optical system is as shown in FIG. 2. Referring to FIG. 2, the level of the high-frequency component of the video signal which is shown on the axis of ordinate changes accordingly as the position of the focusing lens (shown on the axis of abscissa) is shifted. The high-frequency component reaches a maximum level when the lens reaches an in-focus position for a distance to an object. Therefore, for an AF action, the AF microcomputer 123 is arranged to apply a lens driving instruction to the driver 110 via the transmission line 1201 in such a way as to cause the high-pass filter 122 to produce its output at a maximum level. In accordance with the instruction from the AF microcomputer 123, the driver 110 generates a sufficient amount of energy for driving the motor 107 to rotate.

The above-stated arrangement of the AF system necessitates the AF microcomputer 123 to form a driving signal wave form for driving the motor 107. The motor driving signal can be formed by various methods including: A method of controlling the speed of the motor by adjusting a voltage to be applied to the motor; and another method wherein the motor speed is controlled with a signal of a periodic driving wave form, such as a duty driving wave form for a DC motor, by exciting the motor only for a period during which the signal is in an on-state. However, the former method necessitates the applied voltage to be lowered in the event of a low speed. It is therefore impossible to obtain a sufficient torque at a low speed. In view of this, the latter method of performing the duty control is employed in general. In the case of the duty control driving method, since the motor control is performed within an AF control program, the period of the above-stated driving wave form is in synchronism with the program repeating period of the AF microcomputer 123. Therefore, the AF system using this driving signal wave form has been employed for most of the apparatus of varied kinds.

There has recently been proposed many interchangeable lens systems that permit interchange of lenses by separating the lens part from the camera part at the boundary 1202 while leaving the basic arrangement of the AF system unchanged from the state as shown in FIG. 1.

It is necessary, for smooth introduction of the interchangeable lens system of a video camera into the field of consumer appliances, to arrange the lenses to be interchangeable without causing any inconvenience in terms of operation. In the field of consumer appliances, the camera must be arranged to automatically perform aperture control and focus control. Therefore, the interchangeable lens system must be also arranged to cause no impediment to the automatic operation.

As regards a difference between the TV systems adopted in different areas of the world, a lens sold in the area of the NTSC system can be used without any problem in combination with a video camera of the PAL system as the interchangeable lens system of a single-lens reflex camera is irrelevant to the TV system. A converse combination also presents no problem. Therefore, the interchangeable lens system of a video camera is preferably arranged to be interchangeable with that of a video camera conforming to a different TV system for saving the users from being confused.

Generally, the apparatuses of this kind are arranged to control the lens according to control information obtained from the camera body. For this purpose, the video camera is also arranged to control the AF motor driving action in a cycle of field periods or in a cycle which is an integer times as much as the field cycle.

However, the above-stated system presents the following problem: FIG. 3 shows the vertical synchronizing (hereinafter abbreviated as sync) signal of a video signal which is obtained with the program repeating period of the AF microcomputer 123 arranged to be equal to the vertical sync period (50 Hz) of the PAL system which is one of known TV systems and the period of the driving signal wave form to be equal to the program repeating period of the AF microcomputer 123. The vertical sync signal of the video signal is shown in relation to the change-over timing of the motor driving wave form of the conventional system described in the foregoing. The illustration includes the vertical sync signal 201 which is included in the video signal of the PAL system; the vertical sync signal 203 of the NTSC system; and the motor driving signal wave form 1401.

As apparent from FIG. 3, the motor driving signal 1401 is in a pulse wave form which is formed in synchronism with the vertical sync signal 201 of the PAL system. As mentioned in the foregoing description of the conventional system, the period of the motor driving signal 1401 is governed by the program repeating period. Therefore, if the algorithm of forming the driving signal wave form is used as it is for the vertical sync signal of the NTSC system, the motor driving signal would be synchronized with the vertical sync signal 203 of the NTSC system. In other words, the signal comes to have a shorter period and shorter ON time than the motor driving signal 1401 which is in synchronism with the vertical sync signal of the PAL system. The period and the ON time of the motor driving signal wave form should be determined according to the characteristic of the motor 107 which is disposed within the lens unit. Therefore, if this driving wave form is formed by the AF microcomputer 123 which is disposed on the side of the camera body in the interchangeable lens system, the possible kinds of interchangeable lens is not only limited by the TV system but also necessitates the motor to be designed to ensure an accurate driving action which is apposite to the period and ON time of every signal produced on the side of the camera body.

Further, it would be also impossible to obtain a correct wave form unless the AF program repeating period is limited. As a result, the design latitude for the system as a whole would be greatly impaired. The freedom of choosing any desired combination which is the basic purpose of the interchangeable lenses would be denied. Besides, it would greatly increase the cost of the system.

There is no interchangeability between different TV systems in respect of signal processing. More specifically, the camera of the NTSC system, that of the PAL system and that of the SECAM system have no interchangeability in terms of signal processing as they differ in field frequency from each other. In the present situation, therefore, both the lens and the camera must be arranged to match the local TV system. This problem has made it difficult for both the users and the manufacturers to smoothly introduce an interchangeable lens system.

SUMMARY OF THE INVENTION

It is a first object of this invention to solve the above-stated problem.

It is a second object of the invention to provide a camera system which has interchangeability between a plurality of different TV systems.

It is a third object of the invention to provide a lens system which is applicable in common to a plurality of different signal processing systems of interchangeable lens type cameras.

It is a fourth object of the invention to provide a camera system arranged to be capable of controlling various driving means provided on the side of a lens unit for automatic focusing (AF) and automatic exposure control (hereinafter referred to as AE) actions, etc. irrespective of the signal processing method employed on the side of a camera body.

It is a fifth object of the invention to provide a lens system which permits selection of a lens driving motor as desired irrespective of the operating condition of an AF control microcomputer by arranging the frequency of a motor driving signal wave form for driving means disposed on the side of the lens to be not synchronous with the program repeating period of the AF control microcomputer.

Under this object, a lens unit having an actuator for driving a driving part which shifts the position of an optical system and driving means for driving the actuator on the basis of a driving control instruction supplied in a given periodicity from a camera body is arranged according to this invention to set the actuator driving timing of the driving means to be different from timing at which the control instruction is supplied from the camera body to the driving means.

It is a sixth object of the invention to improve the responsivity of a driving system disposed on the side of a lens unit of a camera system.

Under that object, a lens unit embodying this invention as a preferred embodiment thereof comprises an actuator which drives a driving part to change the position of an optical system and driving means which supplies a driving signal in a given periodicity to the actuator on the basis of a driving control signal supplied from control means disposed on the side of a camera body. The lens unit according to the invention is arranged to change the driving state of the actuator in preference to the end of a period of the driving signal when the driving control signal is received from the control means.

It is a seventh object of the invention to provide a lens unit or a camera system wherein, before the driving direction of an actuator for driving a driving part which is arranged to vary the position of an optical system is reversed, braking is applied to the driving part for a given period of time to ensure smooth driving.

It is an eighth object of the invention to provide a camera wherein, in sending a driving control instruction to driving means which drives an actuator to vary the state or position of an optical system to change the actuator driving state of the driving means, information on the change is stored by storing means, and a driving action actually performed is compared with the stored information on the driving control instruction, so that control can be accurately accomplished.

It is a ninth object of the invention to provide a camera wherein: a driving signal for an actuator which shifts the position of a lens is controlled to be in a periodicity which differs from the actual operation periodicity of an AF circuit which is arranged to determine and control an AF state, so that a lens part can be designed irrespectively of the structural arrangement and the operating conditions of the AF (determining and controlling) circuit and that the actuator can be accurately driven according to a lens shifting speed designated by the AF circuit, and, when an instruction for a change in the state of lens shifting is issued by the AF circuit and accepted, a current lens shifting action is brought to a stop and steps of resetting lens shifting conditions are executed, so that the AF performance of the camera can be prevented from being deteriorated.

It is a tenth object of the invention to provide an interchangeable lens, a camera or a camera system including the interchangeable lens which is applicable to cameras of different TV systems and permits apposite lens control by detecting the signal processing method employed by the camera, so that its interchangeability can be ensured for any of different TV systems.

Under this object, a lens unit which is detachably mountable on a camera body and is arranged according to the invention as a preferred embodiment thereof comprises: driving means for varying the optical characteristic of the lens unit; determining means for determining the characteristic of control information received from the camera body; and control means for changing the driving characteristic of the driving means in accordance with the result of determination made by the determining means.

A camera which is arranged to permit a lens unit to be detachably mounted as desired thereon and embodies one feature of the invention is provided with communication means which includes transmission means for transmitting, to the lens unit, control information required for controlling and varying the optical characteristic of the lens unit and receiving means for receiving information on the state of control from the lens unit. The transmission means is arranged to send, to the lens unit, identification information indicating the signal processing method of the camera body along with the control information.

A camera system which has a camera body and a lens unit arranged to be detachably mountable on the camera body and which embodies another feature of the invention comprises: transmission means for transmitting control information which is produced for varying and controlling the optical characteristic of the lens unit and includes identification information indicating the signal processing method of the camera body; driving means which is arranged within the lens unit to vary the optical characteristic of the lens unit; control means which is arranged also within the lens unit to control the driving means according to the control information supplied from the camera body; and control characteristic varying means which is included in the control means and is arranged to vary the control characteristic of the driving means.

It is a further object of the invention to provide an interchangeable lens system which is arranged to give perfect interchangeability of lens units among camera systems of different signal processing methods and is applicable in common to the TV cameras of different signal processing systems of the whole world. To attain this object, a camera system to which the interchangeable lens system is applied according to this invention is arranged to detect, on the side of a lens unit, the TV system employed on the side of a camera body; and to change, according to the TV system detected, a driving algorithm which is employed on the side of the lens unit. This arrangement enables the camera system to drive the lens at a given speed and to prevent any deterioration of characteristics, faulty actions, etc., that result from a discrepancy in signal processing method between the camera body and the lens unit.

These and other objects and features of the invention will become apparent from the following detailed description of embodiments thereof taken in connection with the accompanying drawings.

BRIEF DESCRIPTION OF THE DRAWINGS

FIG. 5 is a chart showing the wave form of a motor driving signal obtained by the first embodiment.

FIG. 6 is a block diagram showing a second embodiment of the invention.

FIG. 7 is a chart showing the wave form of a motor driving signal obtained by the second embodiment.

FIG. 15 is a block diagram showing a camera system which is arranged according to this invention as a sixth embodiment thereof.

FIG. 16 is a timing chart showing the format of information communication to be made between a camera body and a lens unit.

FIG. 17 shows the structure of control data to be sent from a camera body to a lens unit and that of detection data to be sent in reply from the lens unit to the camera body.

FIG. 18 shows an AF action.

FIGS. 19 and 20 show in a timing chart a signal for driving an AF motor disposed on the side of the lens unit.

DETAILED DESCRIPTION OF THE PREFERRED EMBODIMENTS

First embodiment

Figure 1:
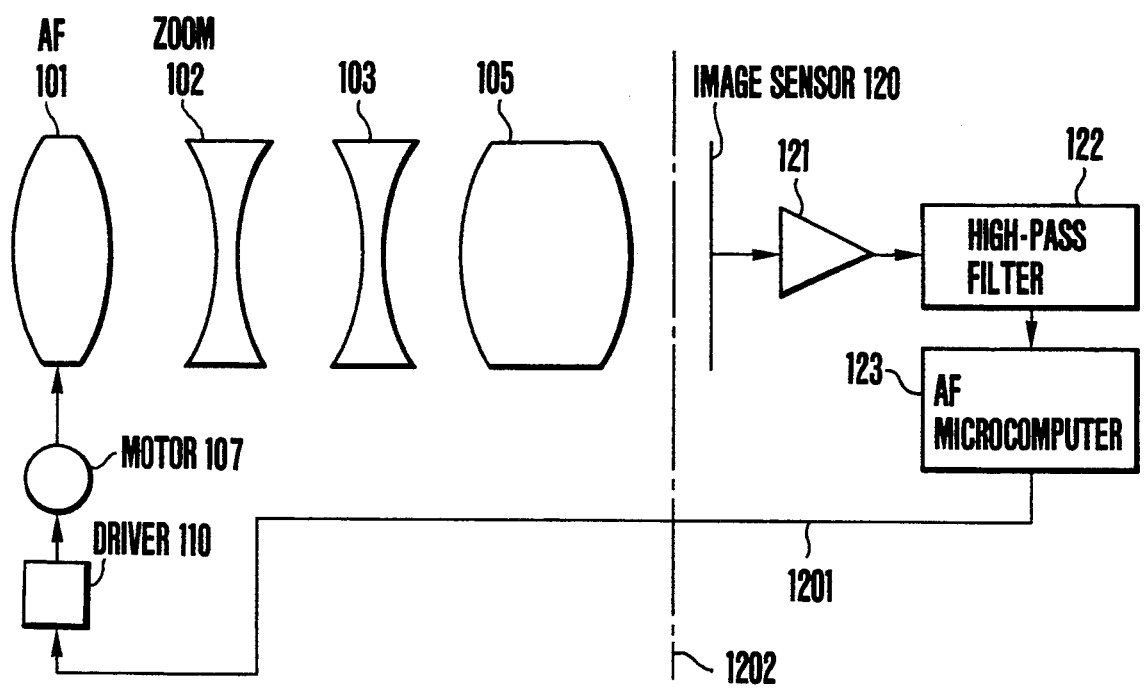
FIG. 1 is a block diagram showing the conventional camera.
Figure 2:
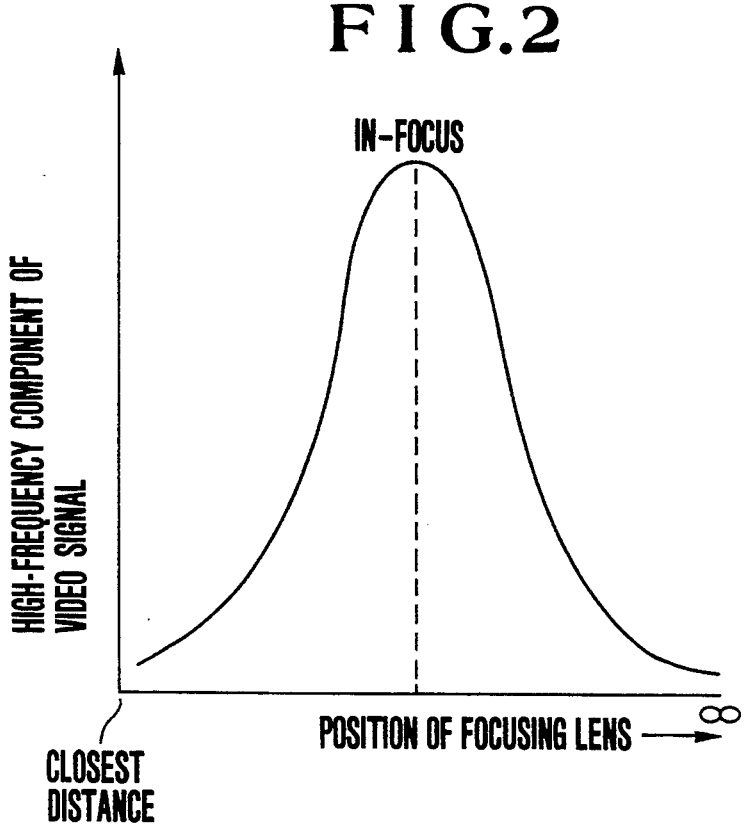
FIG. 2 is a graph showing an AF control action.
Figure 4:
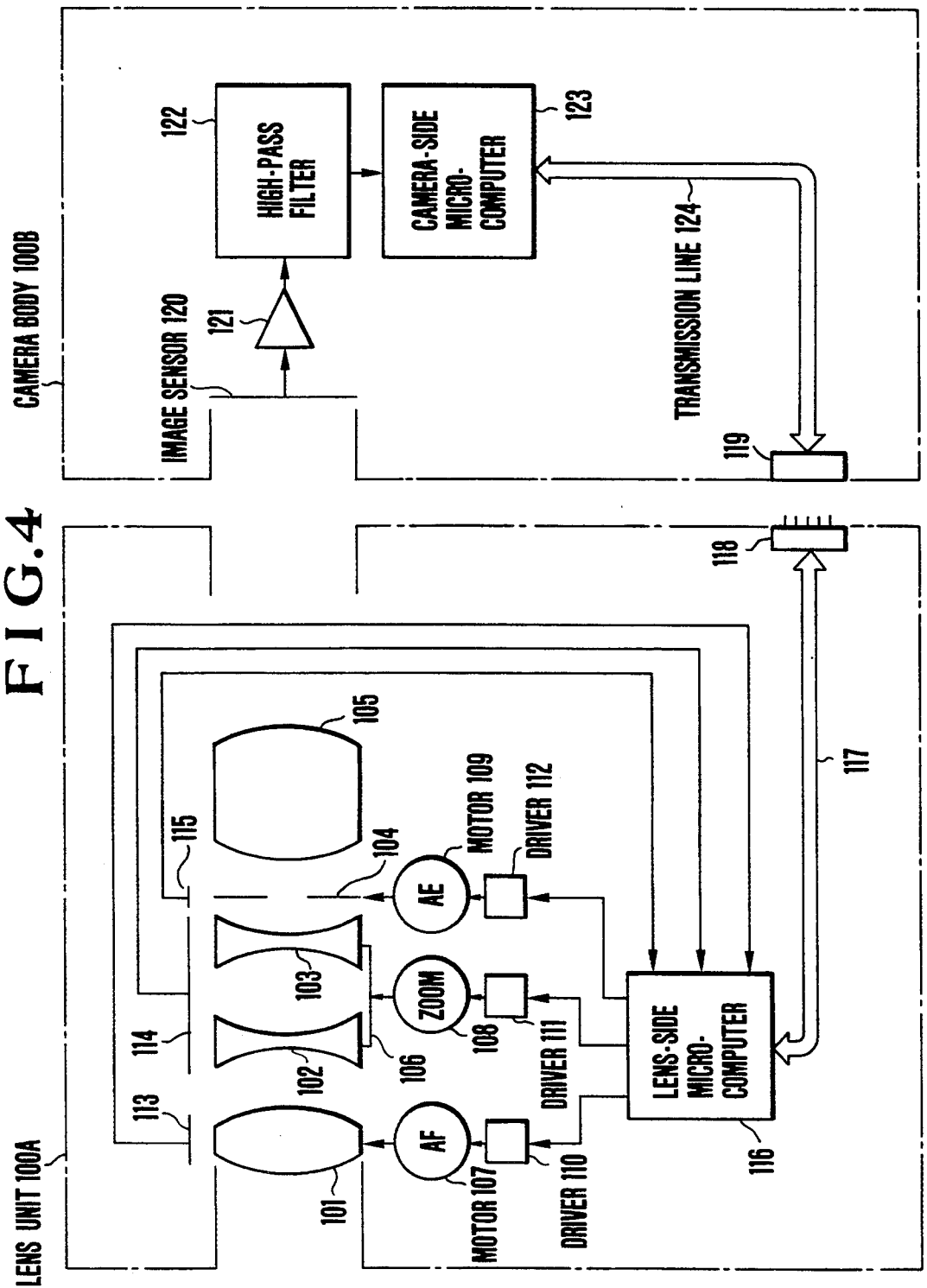
FIG. 4 is a block diagram showing a first embodiment of this invention.

The following describes in detail and with reference to the accompanying drawings a camera which is arranged according to this invention as a first embodiment thereof: FIG. 4 shows in a block diagram the arrangement of the camera. In FIG. 4, all component parts functioning similarly to component parts shown in FIG. 1 are indicated by the same reference numerals and symbols and the details of them are omitted from the description.

Referring to FIG. 4, the illustration includes a lens unit 100A which is arranged for an interchangeable lens system; and a camera body 100B which is included in the same interchangeable lens system. The lens unit 100A is detachably mountable on the camera body 100B. The lens unit 100A includes a diaphragm 104; a cam ring 106 which is provided with a cam groove for moving lens groups 102 and 103 while keeping them in a given positional relation; motors 107, 108 and 109 which are arranged to drive the lens group 101, the cam ring 106 and the diaphragm 104 respectively; drivers 110, 111 and 112 which are arranged to drive the motors 107, 108 and 109 respectively; encoders 113, 114 and 115 which are respectively arranged to detect the displaced degrees of the lens group 101, the cam ring 106 and the diaphragm 104 by converting the displaced degrees into electrical signals; a lens-side microcomputer 116 which is arranged to form and supply driving signals to the drivers 110, 111 and 112 according to a driving instruction received from the camera body; a transmission line 117 which is provided for transmitting the driving instruction to the lens-side microcomputer 116; and a lens-side connector 118. On the side of the camera body 100B, there are provided a camera-side connector 119; and a transmission line 124 which is arranged to transmit the driving instruction of a camera-side microcomputer 123 to the connector 119.

An object's image is projected on the image sensing surface of an image sensor 120 which is a CCD or the like through the lens groups 101, 102 and 103, the diaphragm 104 and another lens group 105. The image thus obtained is converted into an electrical signal in the same manner as in the case of the conventional system. The high-frequency component of the electrical signal is alone supplied to the microcomputer 123 through an amplifier 121 and a high-pass filter 122. Then, in the same manner as in the case of the conventional system described in the foregoing, the microcomputer 123 produces and supplies a lens driving instruction via the transmission line 124, the connectors 119 and 118 and the transmission line 117 to the lens-side microcomputer 116 in such a way as to bring the high-frequency component up to the maximum level thereof. In accordance with this lens driving instruction, the lens-side microcomputer 116 supplies a driving signal to the driver 110 for shifting the position of the focusing lens group 101.

The wave form of the driving signal supplied from the lens-side microcomputer 116 to the driver 110 is represented by a wave form 202 in FIG. 5. In FIG. 5, other wave forms 201 and 203 respectively represent the vertical sync signal wave forms of TV signals of the PAL and NTSC systems as described in the foregoing with reference to FIG. 3. The motor driving signal wave form 202 is obtained in accordance with this invention.

Figure 3:
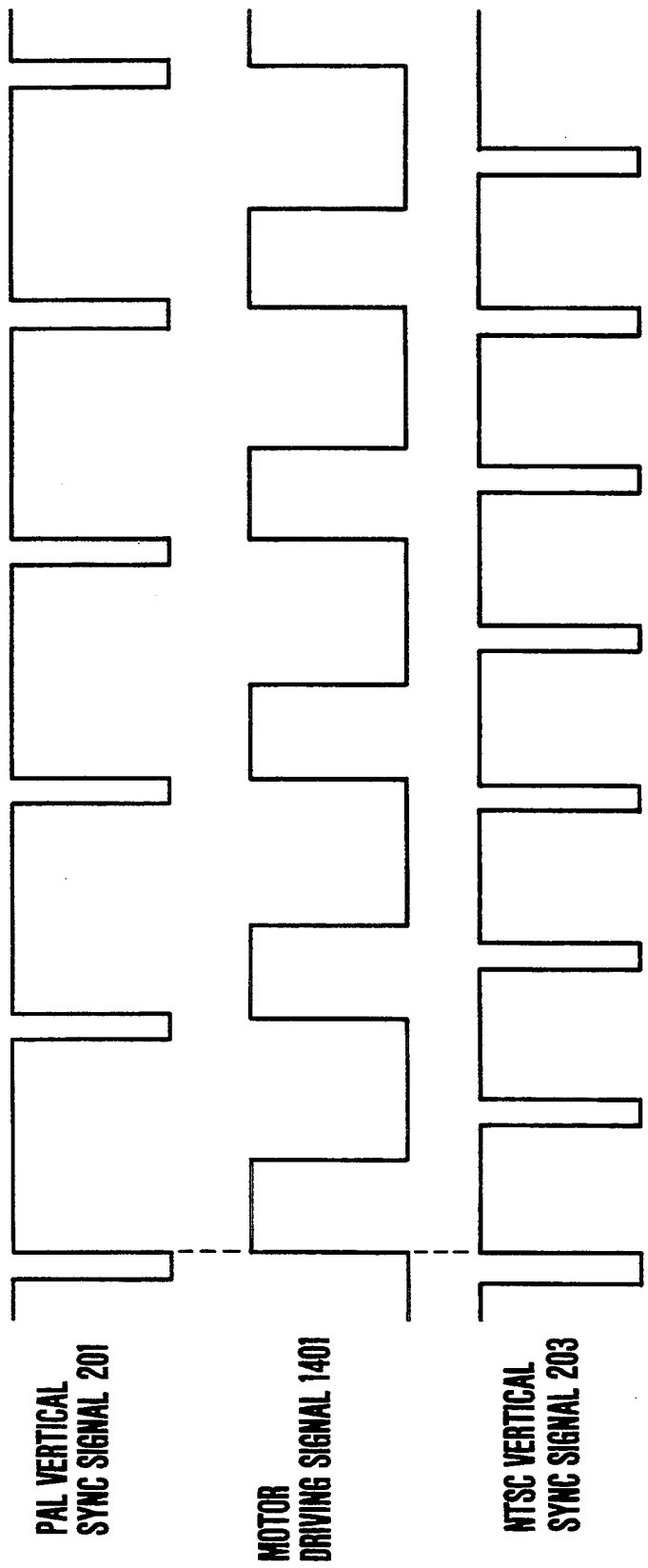
FIG. 3 is a chart showing the wave form of a motor driving signal obtained by the conventional system.

Although the program execution repeating period of the camera-side microcomputer 123 may be synchronized with a vertical sync signal in the same manner as in the case of FIG. 3 described in the foregoing, the motor driving signal wave form 202 is changed for changing the speed of the motor without synchronizing the wave form either with the vertical sync signal 201 of the PAL system or with the vertical sync signal 203 of the NTSC system. The lens-side microcomputer 116 disposed within the lens unit 100A is thus arranged to generate the motor driving signal wave form 202 which is not in synchronism with the program execution repeating period of the camera-side microcomputer 123. This arrangement allows the lens unit to be freely designed without being restricted by the program arrangement of the camera-side microcomputer 123 and also without adjusting the characteristic of the motor disposed within the lens unit to a difference between TV systems. The lens-side microcomputer 116 and the motor disposed within the lens unit are arranged to have a predetermined relation between a motor speed and a driving wave form defined, for example, in the form of a table arranged within the microcomputer 116. This arrangement enables the lens unit to perform a lens driving action exactly in accordance with the instruction of the camera-side microcomputer 123 by just receiving from the microcomputer 123 information on the motor speed and the motor driving direction. In a practical application, means for generating the wave form of the motor driving signal 202 may be obtained, for example, by setting a clock signal and a program execution repeating period to be used by the lens-side microcomputer 116 independently of the camera-side microcomputer 123.

Second embodiment

FIG. 6 shows the arrangement of a second embodiment of the invention. The component parts functioning similarly to the parts described in the foregoing are indicated by the same reference numerals and symbols used in the foregoing. Referring to FIG. 6, motors 301 and 302 are arranged to shift the positions of lens groups 102 and 309 respectively. The motor 302 is a stepper motor. Drivers 303 and 304 are arranged to drive the motors 301 and 302. Encoders 305 and 306 are arranged to detect the displaced degrees of the lens groups 102 and 309 by converting the displaced degrees into electrical signals. A lens-side microcomputer 307 is provided for control. A first lens group 308 is arranged to be stationary. The lens group 309 is a third lens group and is arranged to adjust the focus which varies accordingly as the position of the lens group 102 is shifted and also to perform focus adjustment when the lens group 102 is in repose. A reference numeral 300A denotes the lens unit of the interchangeable lens system of the second embodiment.

Like in the case of the first embodiment, an image projected on an image sensor 120 through the optical system is converted into an electrical signal. A camera-side microcomputer 123 gives a focusing lens driving instruction to the lens-side microcomputer 307 in such a way as to bring the high-frequency component of the electrical signal to a maximum level thereof.

The lens group 309 of the lens unit 300A has a focus adjusting function. Therefore, in accordance with the focusing lens driving instruction from the camera-side microcomputer 123, the lens-side microcomputer 307 forms and supplies a driving signal to the driver 304.

In cases where focus adjustment is to be made by a lens group other than the first lens group as in the case of the lens unit 300A, an arrangement to vary a lens power by shifting the position of the lens group 102 generally makes the correction locus of the lens group 309 complex. Therefore, the lens group 309 must be accurately controlled. To meet this requirement, the second embodiment uses a stepper motor as the lens driving motor 302 as mentioned above.

With the stepper motor 302 used for driving the lens group 309 which serves as a focusing lens, the motor driving signal output from the lens-side microcomputer 307 is arranged to have a wave form which is shown in FIG. 7, wherein the same wave forms as those shown in FIG. 5 are indicated by the same reference numerals.

Referring to FIG. 7, reference numerals 401, 402, 403 and 404 denote driving wave forms applied to the terminals of a two-phase exciting stepper motor. Like in the case of the first embodiment, the clock signal and the program execution repeating period of the lens-side microcomputer 307 are arranged independently of the camera-side microcomputer 123. Hence, the motor driving signal wave form of the microcomputer 307 is not in synchronism either with the vertical sync signal 201 of the PAL system or with the vertical sync signal 203 of the NTSC system. The arrangement enables the lens-side microcomputer 307 to generate the driving signal wave form solely on the basis of driving speed and direction information obtained from the camera-side microcomputer 123. More specifically, a table of a plurality of different periods of motor driving signal wave forms which correspond to possible control instructions to be received from the camera body is arranged within the lens-side microcomputer 307. Upon receipt of an instruction, an applicable driving wave form which corresponds to the instruction is selected from the table and is supplied to the motor driver.

Third embodiment

Figure 8:
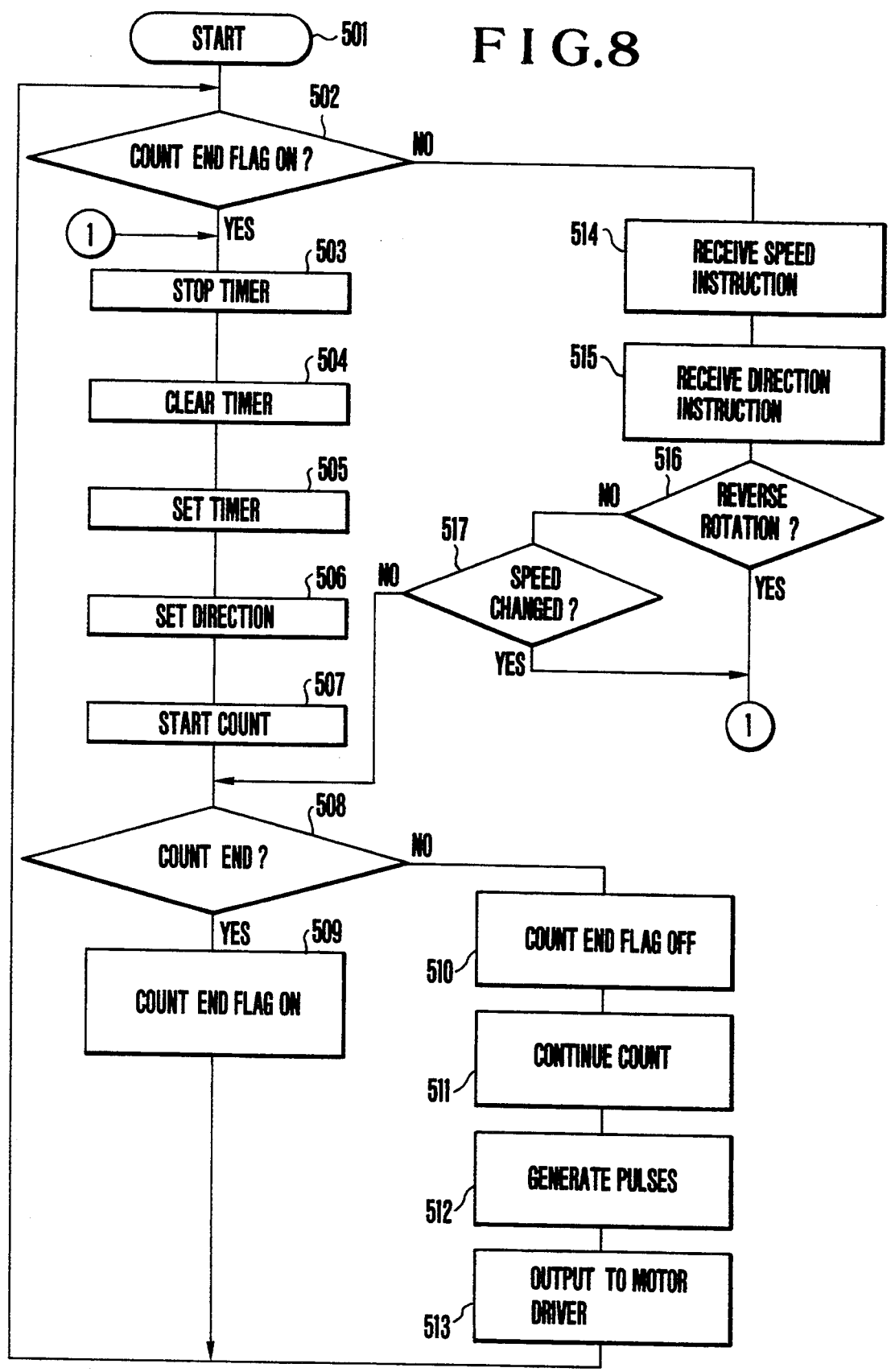
FIG. 8 is a flow chart showing the control operation of a third embodiment of the invention.

FIG. 8 shows in a flow chart a third embodiment of this invention. The flow chart includes the steps of a control program provided within a lens-side microcomputer 116 or 307. The component parts of the third embodiment are arranged similarly to those of the first and second embodiments. The third embodiment relates to a program adapted for a case wherein an instruction for reversing the focusing lens driving direction is received from the camera-side microcomputer 123 while the program of the first or second embodiment is being executed.

Referring to FIG. 8, the program begins to be executed at a step 501. At a step 502: A check is made for the state of a flag which indicates the end of a count made by a timer provided within the lens-side microcomputer for forming the pulse wave form of the motor driving signal. At a step 503: The operation of the timer is brought to a stop. At a step 504: The counted value of the timer is cleared. At a step 505: The count end value of the timer is newly set. At a step 506: The polarity of the motor driving signal is decided according to the motor driving direction indicated by the instruction of the camera-side microcomputer 123. At a step 507: The timer is caused to begin its count. At a step 508: A check is made for arrival of the counted value of the timer at the count end value set at the step 505. At a step 509: The count end flag which is to be checked at the step 502 is turned on. At a step 510: The count end flag is turned off. At a step 511: The timer is allowed to continue its count. At a step 512: Pulses of even period are generated depending on the state of the timer. At a step 513: The pulses generated at the step 512 are supplied to the motor driver. At a step 514: A speed instruction is received from the camera-side microcomputer 123. At a step 515: A direction instruction is received from the camera-side microcomputer 123. At a step 516: The direction instruction is checked to find if the driving direction of the instruction is reverse to the current motor driving direction. At a step 517: A check is made for any change indicated in the speed instruction.

After the start of the program at the step 501, the count end flag which is arranged to indicate the end of the count of the timer is checked to see if the count has come to an end. If the count end flag is found in its on-state, it indicates that the formation of one cycle amount of the motor driving signal wave form has been completed. In that case, the flow comes to the step 503 to temporarily stop the timer from operating. After that, the timer is reset at its start value at the step 504. The flow comes to the step 505 to newly set a timer count end value, i.e., a length of time for generating one cycle amount of the motor driving signal wave form, in accordance with a speed instruction sent from the camera-side microcomputer 123. After that, the polarity of the motor driving signal wave form which determines the motor driving direction is decided at the step 506 according to the direction instruction received from the camera-side microcomputer 123. The timer is allowed to begin its count at the step 507.

In a case where the count end flag is found to be in an off-state at the step 502, the timer is not allowed to restart its count. Then, the driving instruction from the camera-side microcomputer 123 is alone accepted at the steps 514 and 515. The flow comes to the step 516 to find whether the driving direction indicated in the latest instruction is the the same as the current driving direction or reverse thereto. In the event of the reverse direction, the flow immediately jumps to the step 503 to once again form the motor driving pulses.

Further, with the motor driving direction found to be unchanged at the step 516, if the speed instruction is found to have changed at a next step 517, the flow also jumps to the step 503.

After the timer is allowed to restart its count at the step 507, the flow comes to the step 508 to check the counted value of the timer for the end of the timer operation time set at the step 505. If the counted value is found to have reached the set time value, the flow proceeds to the step 509 to turn on the count end flag. After that, the flow comes back to the step 502 to repeat the same steps of program described above. Further, if the count by the timer is found not to have come to an end at the step 508, the count end flag is turned off at the step 510. Then, at the step 511, the timer is allowed to continue its count for generating the motor driving signal according to the instruction. The motor driving pulse wave form is formed at the step 512 and is supplied to the motor driver at the step 513. The motor is driven accordingly.

Figure 9:
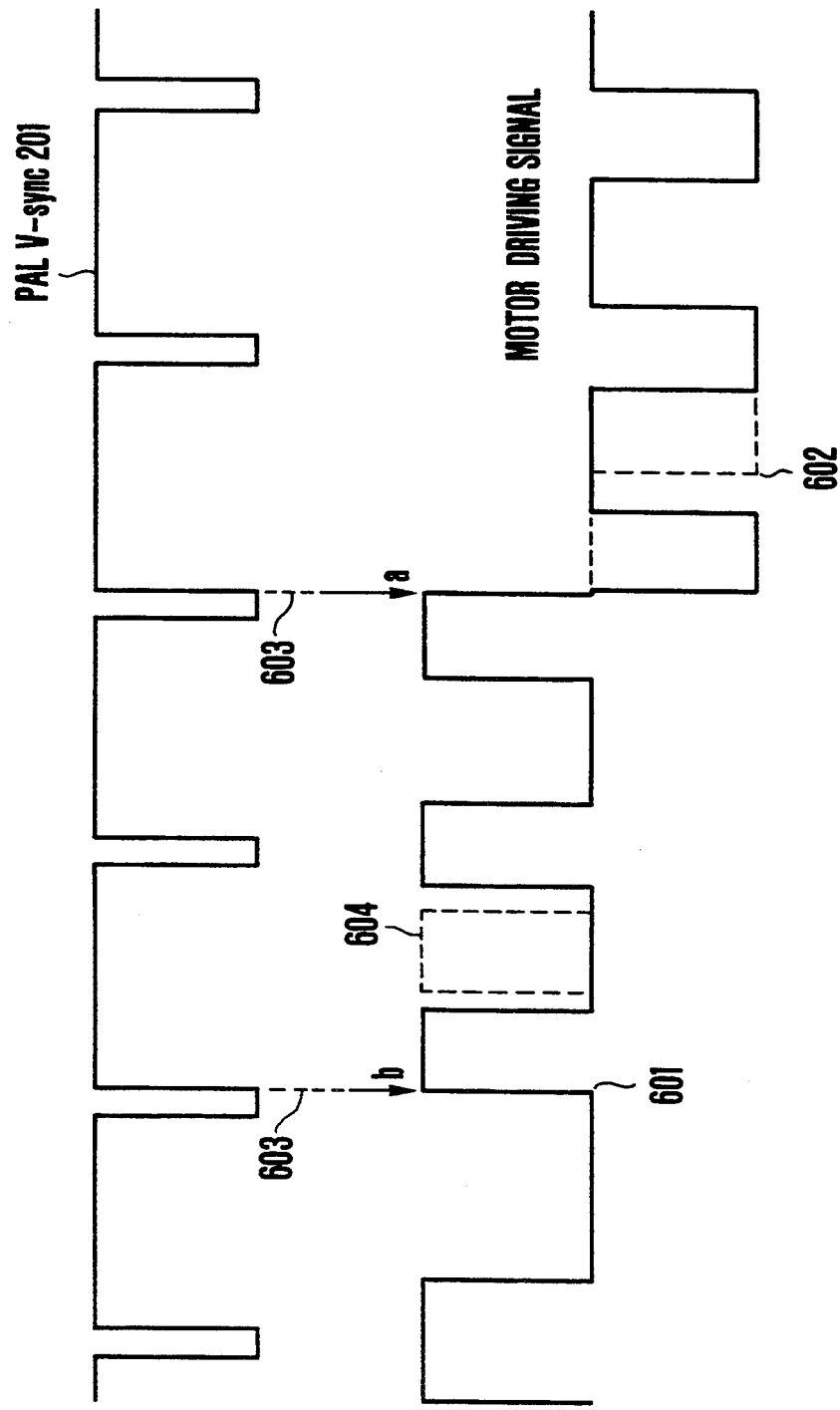
FIGS. 9 and 10 show the wave form of a motor driving signal obtained by the third embodiment.

FIG. 9 shows a motor driving signal wave form obtained in a case where the arrangement of this embodiment is applied to a duty driving action on a DC motor. Referring to FIG. 9, a motor driving signal wave form 601 is formed by this embodiment. In a case where the reverse motor rotation detecting step 516 is omitted from the control algorithm of FIG. 8 and the control is to be performed in such a way as to keep the motor driving wave form forming state unchanged until the end of the count by the timer even if an instruction for reverse rotation of the motor is received from the camera-side microcomputer 123, the first pulse of the motor driving signal after the instruction for the reverse rotation rises at a timing as shown at a point 602 in FIG. 9. Assuming that the program execution repeating period of the camera-side microcomputer 123 is in synchronism with the vertical sync signal 201 of the PAL system, the focusing motor driving instruction of the camera-side microcomputer 123 is produced at a timing point as indicated by a point 603. In the case of FIG. 9, the motor driving direction is assumed to be reversed at a point "a" and the speed to be changed at a point "b". Further, in the event of a control method whereby the speed change detecting step 517 is omitted from the program of FIG. 8 and the motor driving wave forming state is kept unchanged until the end of the count by the timer, the first pulse after the speed change instruction rises at a timing as indicated by a point 604.

As apparent from FIG. 9, when the focusing motor driving instruction is changed, the steps 516 and 517 which are provided for detecting the change enable the lens unit to immediately drive the lens in response to the instruction received from the camera-side microcomputer 123. This not only improves the response speed of the lens unit but also prevents the camera-side microcomputer 123 from performing a faulty action by producing a further instruction by mistake with the change not carried out in response to the instruction for the change.

Further, in accordance with the algorithm of this embodiment, the control is arranged to be restarted from the step 503 even when, for instance, the speed and direction changing instructions are simultaneously issued. Therefore, in this instance, the rotating direction and speed of the motor can be simultaneously changed.

Figure 10:
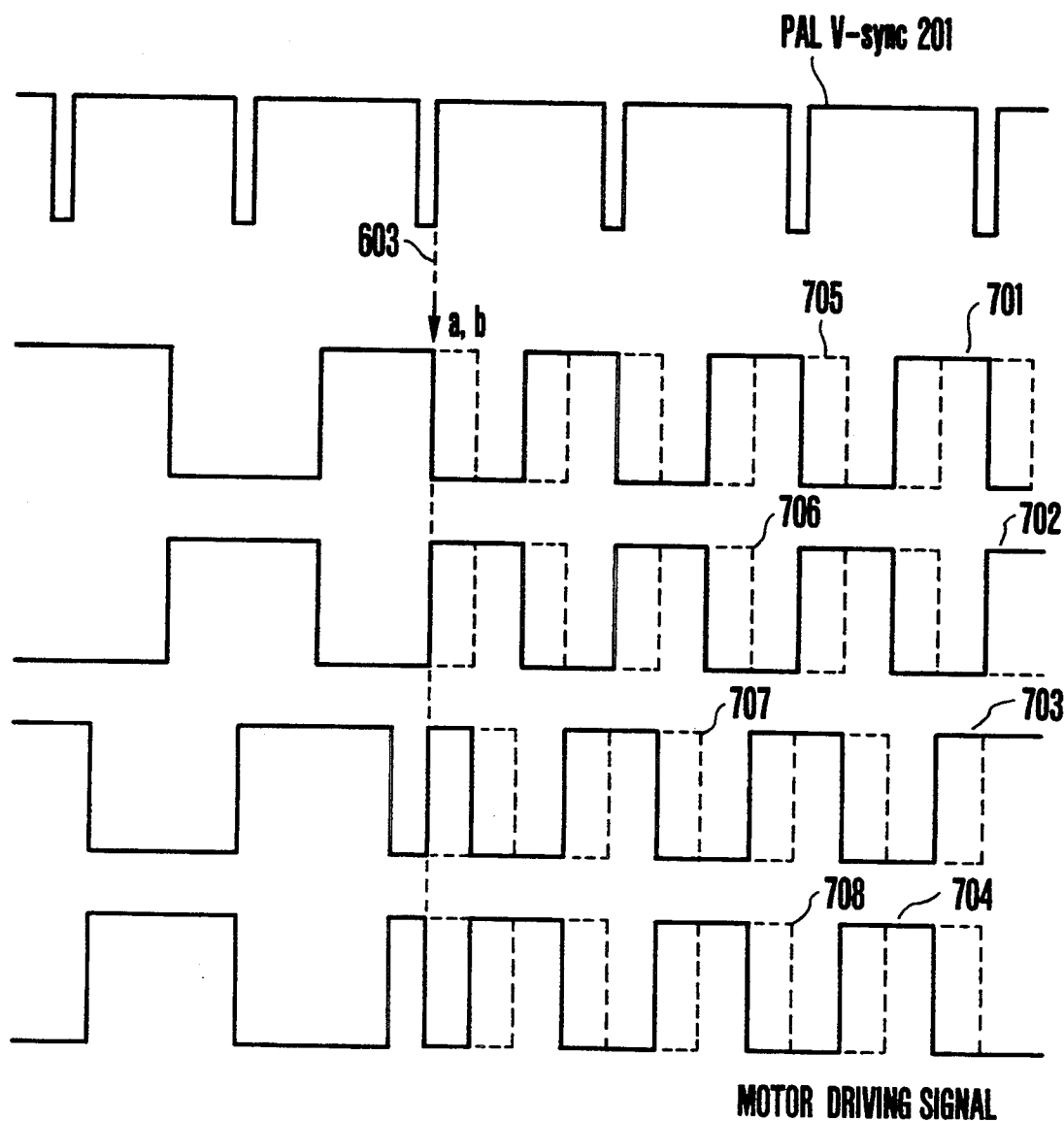

FIG. 10 is a time chart showing the operation of the third embodiment performed by using the stepper motor. In FIG. 10, reference numerals 701, 702, 703 and 704 denote motor driving signal wave forms obtained by the embodiment. Wave forms 705, 706, 707 and 708 indicated by broken lines represent motor driving signal wave forms obtained in accordance with a program in which the steps 516 and 517 of the control flow of FIG. 8 for detection of instructions for changing the motor rotating direction and speed are not included. It is apparent from the illustration that such a program causes a delay in timing as the motor driving signal wave form is not changed in response to the change instructions until completion of the motor driving cycle. Whereas, in the case of the embodiment, the direction and speed can be immediately changed even when the instructions are simultaneously issued at a time point 603 for changing the rotation and the speed.

Fourth embodiment

Figure 11:
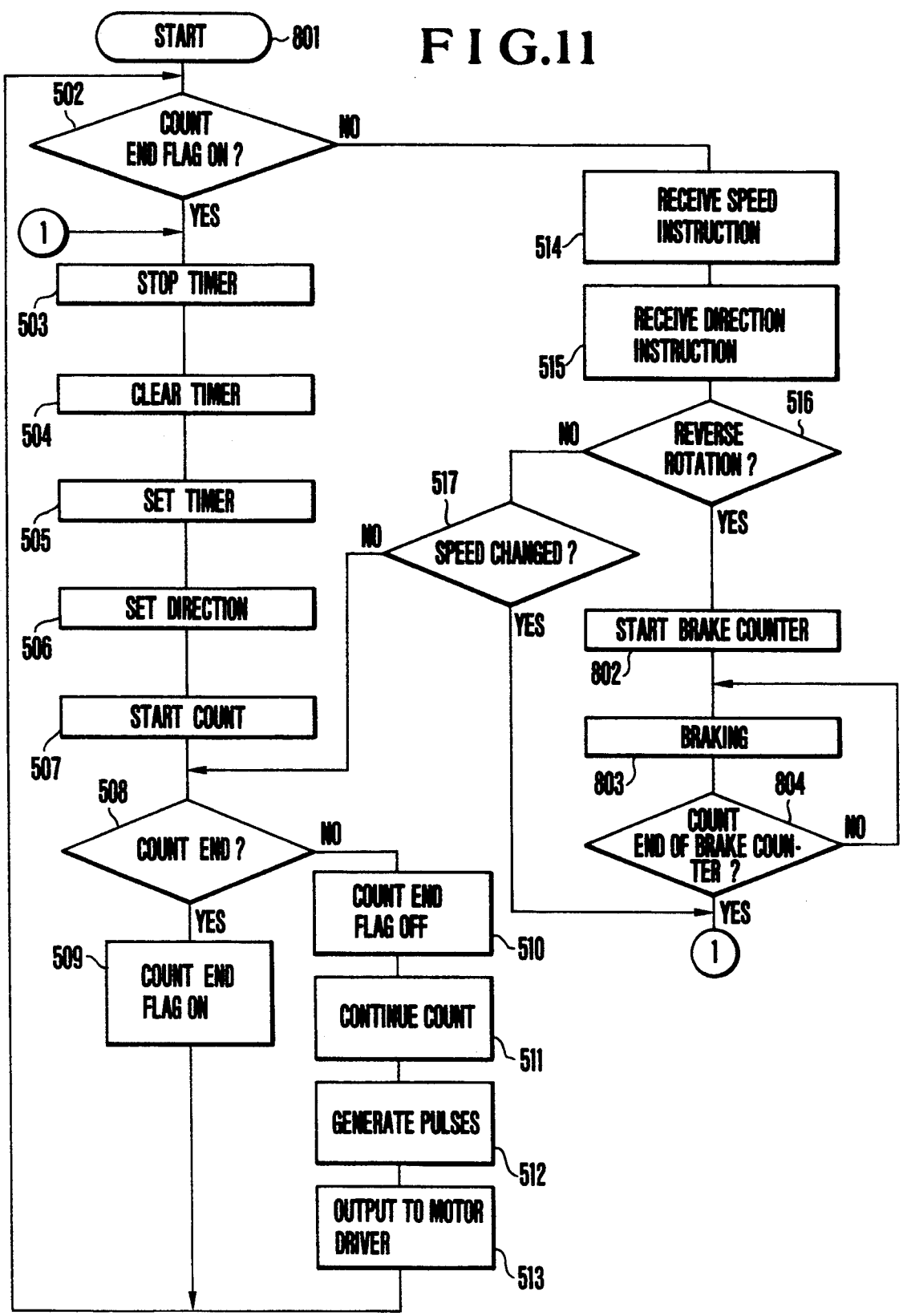
FIG. 11 is a flow chart showing the control operation of a fourth embodiment of the invention.

FIG. 11 is a flow chart showing a program set within the lens-side microcomputer of a system which is arranged as a fourth embodiment of the invention. The system arrangement required for this program is the same as the system of FIG. 4 or FIG. 6. In FIG. 11, the steps provided for the same actions as in the case of the flow chart of FIG. 8 are indicated by the same step numbers. The program of the fourth embodiment is arranged to improve the responsivity of the system in reversing the motor driving direction.

Referring to FIG. 11, the program includes the following steps in addition to the steps of FIG. 8 which are described in the foregoing: A step 801 which is provided for declaration of a start of the program; a step 802 for actuating a timer which is arranged to count a length of time of brake application to the motor when an instruction for determining the motor driving direction is produced at the step 516 at which a check is made for the presence or absence of a motor-driving-direction changing instruction; a step 803 for brake application to the motor by short-circuiting the terminal of the motor; and a step 804 for making a check for the end of the count by the above-stated brake counter (or timer). Other steps are the same as in the case of FIG. 8 and therefore are omitted from description.

In the case of the third embodiment, the polarity of the motor driving signal or, if the motor is a stepper motor, the phase of the motor is immediately changed upon receipt of an instruction from the camera-side microcomputer for reversing the lens shifting direction. In accordance with the arrangement of the third embodiment, the motor driving signal can be immediately inverted. However, it requires a long period of time before the movement of the lens actually comes to a stop for commencement of its reverse movement. In other words, the lens cannot immediately reverse its movement in response to the change instruction of the camera-side microcomputer because of the speed of the lens at which it has been shifted before receipt of the instruction; the inertia of the lens; and variations of the period and duty ratio of the motor driving signal obtained after the reversing instruction. With the instruction not immediately responded by the lens, the camera-side microcomputer produces an instruction for a greater speed. The lens becomes able to begin its reverse movement by then and comes to move in response to the new instruction for a greater speed. This results in overshooting a correct lens position. Then, to correct it, another instruction for reverse driving is issued and the so-called hunting tends to result from this.

The fourth embodiment is arranged to compensate for this in the following manner: When the lens-side microcomputer receives the reversing instruction, the polarity or phase of the motor driving signal is not immediately changed but, before reversing the rotating direction of the motor, the motor is brought to a stop by applying the brake by short-circuiting the motor terminal.

The flow of the program of this embodiment after the count end flag is found to be in an on-state at the step 804 is identical with the flow of the program of the third embodiment shown in FIG. 6. Further, even when the count end flag is found to be in an off-state, the flow of the program becomes the same as in the case of the preceding embodiment shown in FIG. 3 if the driving instruction from the microcomputer 123 does not indicate a reverse motor driving direction.

Referring to FIG. 11, if a reversing instruction is found to have been received at the step 516, the timer which is provided for brake application over a given period of time begins its count at the step 802. The length of braking time is set at a plurality of different values for different lens shifting speeds. One of the different braking time values is selected according to the lens shifting time desired. More specifically, a table of braking time values in correlation with the lens shifting speed values is set beforehand within the microcomputer. The brake is applied by short-circuiting the motor terminal at the step 803. At the next step 804, a check is made for the end of the braking time. If the braking time is found not to have expired as yet, the flow comes back to the step 803 to allow the brake application to continue. If the braking time is found to have expired, the flow comes back to the step 503 to begin the driving action in the reverse direction.

Figure 12:
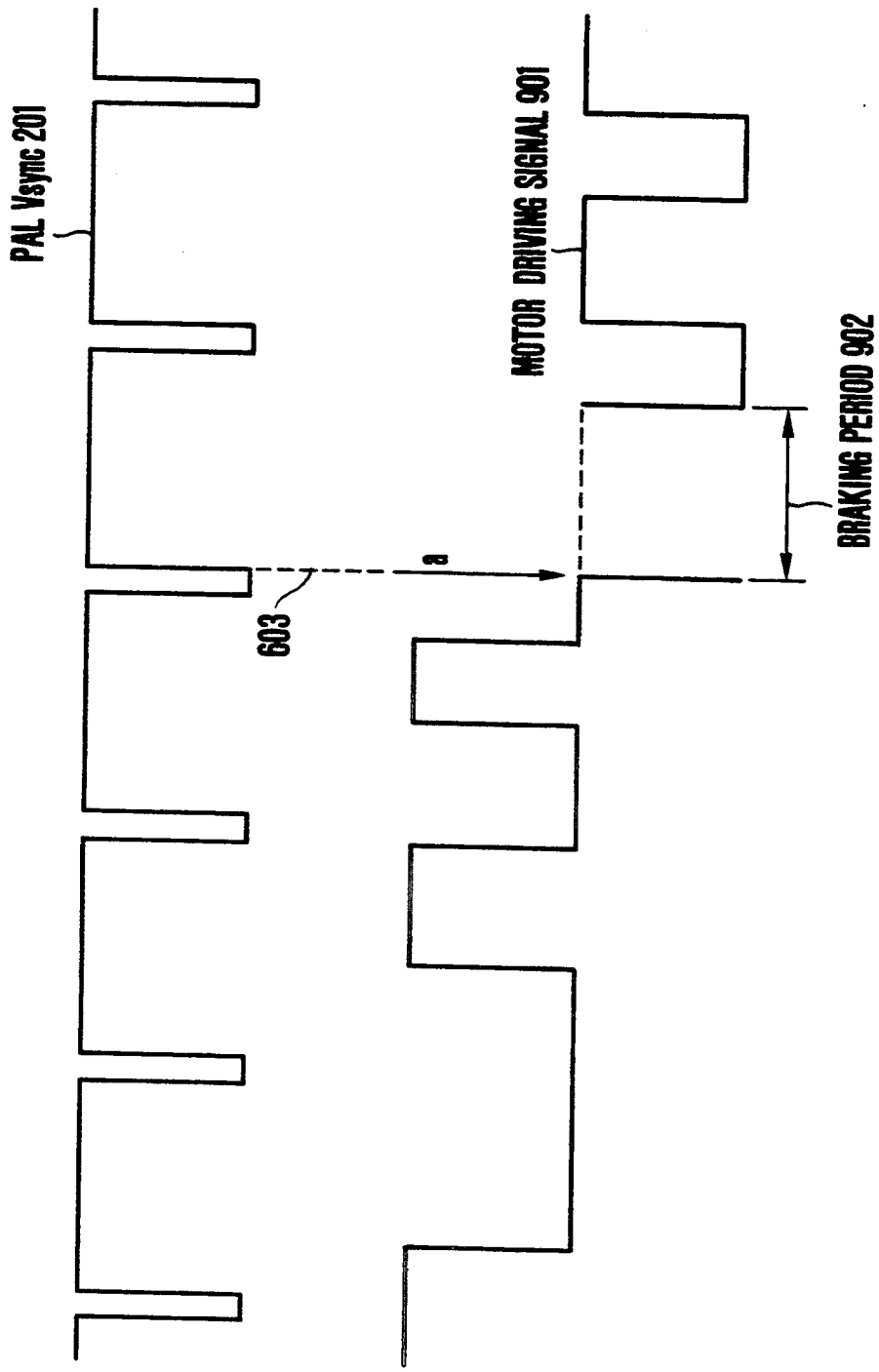
FIG. 12 is a chart showing the wave form of a motor driving signal obtained by the fourth embodiment.

FIG. 12 is a timing chart showing the motor driving signal formed by the fourth embodiment shown in FIG. 11. Referring to FIG. 12, a driving signal wave form 901 is formed by the program of FIG. 11. A reference numeral 902 denotes a braking period. As apparent from FIG. 12, when a reversing instruction is issued at a point of time 603, the brake is immediately applied and the motor driving signal for driving in the reverse direction is produced after the expiration of the predetermined braking period.

While the braking period is arranged to be set by means of the timer in the case of FIG. 11, the braking period can be set by means of the position encoders which are shown in FIGS. 4 and 6. In that instance, the brake application is allowed to continue until the movement of the lens is found to have come to a stop through the output of the position encoder and a reversing signal is produced after confirmation of the stop.

In each of the third and fourth embodiments, the count by the timer is arranged to be restarted from the beginning through the steps 503, 504, 505 and 506 in the case of reversing the motor driving direction. However, if the driving system is arranged to be adequately operable even if the width of the first pulse of the motor driving signal obtained after the inversion of the driving signal, these steps can be omitted.

Fifth embodiment

Figure 14:
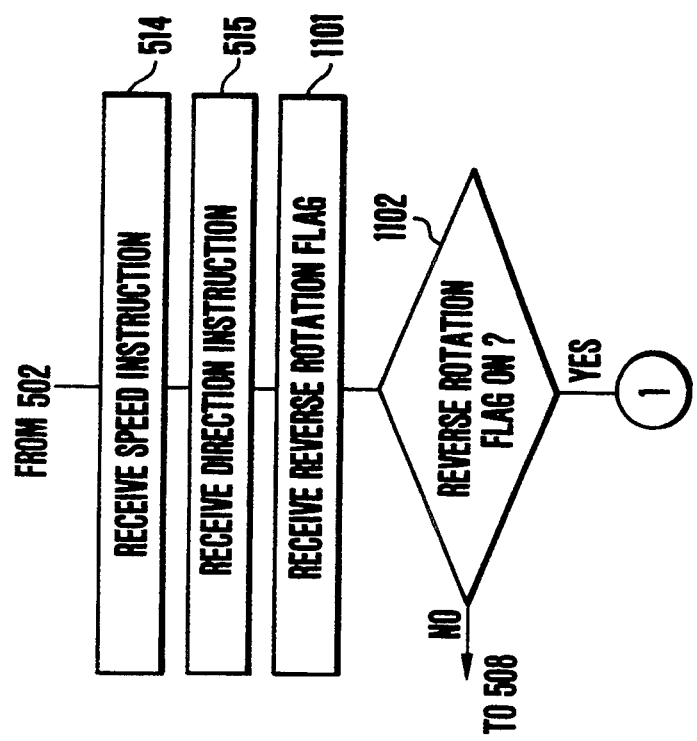
FIGS. 13 and 14 are flow charts showing the control operation of a fifth embodiment of the invention.
Figure 13:
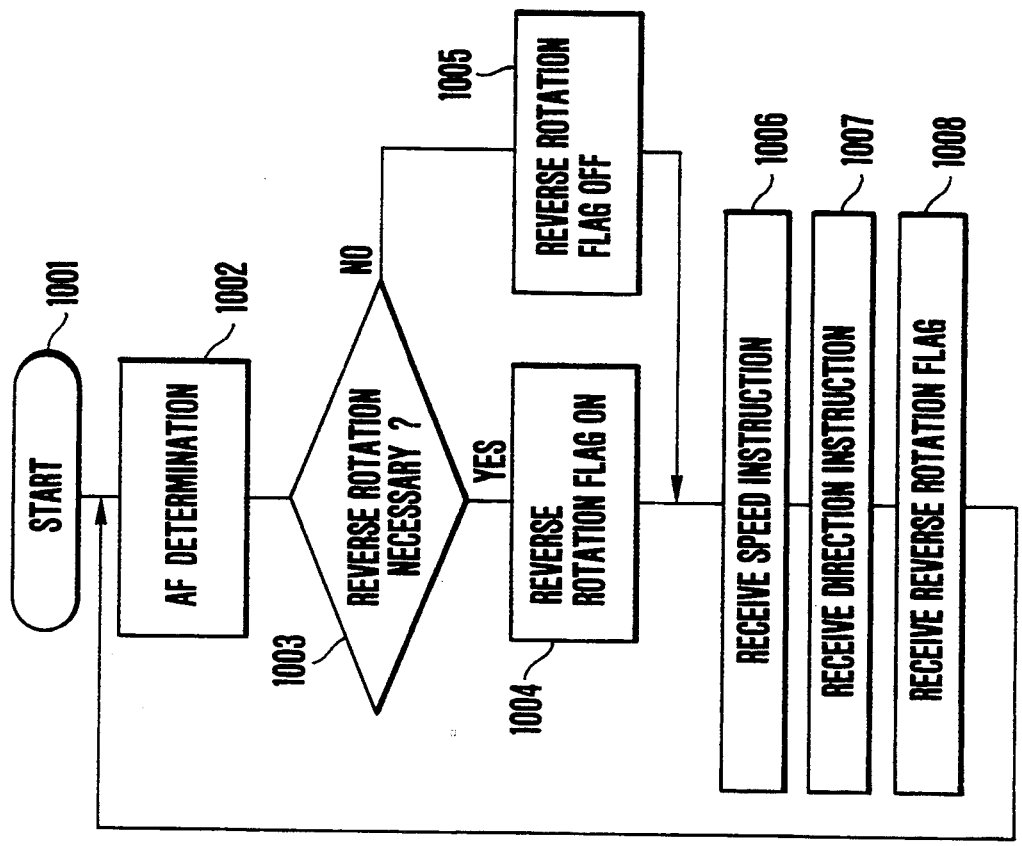

FIGS. 13 and 14 are flow charts showing the programs of a fifth embodiment of this invention. The program of FIG. 13 is set within the camera-side microcomputer and the program of FIG. 14 is also set within the lens-side microcomputer. Referring to FIG. 13, the program consists of steps 101 to 1008 which are arranged as follows: Step 1001: The program begins to be executed. At the step 1002, a check is made for the focused state of the optical system. At the step 1003, a check is made for the necessity of reversely shifting the focusing lens. At the step 1004, a reverse rotation flag which is arranged to be turned on when the lens must be reversely shifted is turned on. At the step 1005, the reverse rotation flag is turned off. At the step 1006, a speed at which the focusing lens is to be shifted is determined according to the focused state detected at the step 102 and an instruction for the speed thus determined is sent to the lens unit. At the step 1007, the direction in which the focusing lens is to be shifted is likewise determined and an instruction for the direction thus determined is sent to the lens unit. At the step 1008, the reverse rotation flag is sent to the lens unit.

In FIG. 14, the flow chart includes only the steps to be executed when the count end flag is found to be in an off-state in the flow of program shown in FIG. 11. The rest of the program of the fifth embodiment is the same as the program of FIG. 11. The flow of program of FIG. 14 includes a step 1101 at which the reverse rotation flag is received; and a step 1102 at which the reverse rotation flag is checked for its on-state. These two steps are added to the steps of the steps of FIG. 11. In the case of the fifth embodiment, the camera-side microcomputer is arranged to make a check for reverse rotation which is made by the lens-side microcomputer in the case of the third and fourth embodiments described in the foregoing.

When the program begins to be executed at the step 1001 within the camera-side microcomputer, the flow of the program comes to the step 1002 to decide the direction in which the focusing (lens driving) motor must be rotated in order to attain the peak level of the video signal. At the steps 1006 and 1007: The speed and the direction of the motor rotation are decided. The focusing motor is caused to rotate at a higher speed if the signal level is far from the peak level and at a lower speed if the signal level is close to the peak level in accordance with a predetermined algorithm. In this case, if it is judged at the step 1003 that the driving direction has been reversed, the reverse rotation flag is turned on at the step 1004. If not, the flag is turned off at the step 1005. The reverse rotation flag is sent to the lens-side microcomputer at the step 108. The lens-side microcomputer receives the reverse rotation flag at the step 1001. At the step 1002: A check is made for the on- or off-state of the flag. If the flag is found to be on, the flow immediately jumps to the step 503 to change the polarity (or the phase) of the motor driving signal.

The above-stated programs of the fifth embodiment lessens the program load on the lens-side microcomputer to enhance the processing speed and to permit reduction in the area required for the memory thereof.

While each of the five embodiments has been described as using a motor for shifting a focusing lens, it goes without saying that the invented arrangement is applicable also to the actuators of lenses of different kinds including a zooming lens, etc.

In accordance with this invention, as described in the foregoing, the driving signal for driving the lens shifting actuator is controlled in a cycle which differs from the operating cycle of a circuit which is arranged to determine and control the AF action. This enables the lens unit to be freely designed without being fettered by the structural arrangement and the operating conditions of the AF determining and controlling circuit. In addition to this advantage, the invented arrangement also enables the motor to be driven appositely to the lens shifting speed designated by the AF circuit.

Further, when an instruction for changing the lens shifting state (or mode) is found to have been produced at the above-stated AF circuit, the steps for bringing to a stop the current lens shifting action and for resetting the lens shifting conditions are executed. The AF performance, therefore, can be prevented by virtue of these steps from being deteriorated by the performance of the lens.

In the case of the embodiments described, the objects of this invention are attained with the driving control over the motor, i.e., driving means, carried out on the side of the lens unit independently of and not synchronously with the operation performed on the side of the camera body. In a sixth embodiment and ensuing embodiments of the invention, the characteristic of control data sent from the camera body is determined on the side of the lens unit and the characteristic of the driving means is changed according to the result of determination. These embodiments are described as follows:

Sixth embodiment

FIG. 15 shows in a block diagram the arrangement of an interchangeable-lens type video camera system which is arranged as a sixth embodiment of the invention.

Referring to FIG. 15, the illustration includes a lens unit LU; a camera body CU; and a mount part M which is disposed between the lens unit LU and the camera body CU. The camera system comprises a photo-taking lens 1; a diaphragm 2; an actuator 3 for driving the diaphragm 2; a driver 4 which is arranged to control the actuator 3; a D/A converter 5; an AF motor 6 which is arranged to carry out focus adjustment by shifting the position of the photo-taking lens 1 along the optical axis thereof; a driver 7 which is arranged to drive and control the AF motor 6; encoders 8 which are arranged to detect the state of the lens including, for example, the shifted position, focal length, aperture value, etc. of the lens and to produce data on them; an A/D converter 9 which is arranged to-analog-to-digital convert the detection data output from the encoders 8; and a lens controlling microcomputer 10 (hereinafter referred to as lens microcomputer). The lens microcomputer 10 is arranged to read and decode the control data which is sent from the camera body side; to perform various control actions including focus adjustment, aperture adjustment, etc.; and to send the detection data of the lens state detecting encoders 8 to the camera body side.

The lens microcomputer 10 performs focus adjustment by decoding the control data sent from the camera body and by controlling and causing the driver 7 to drive the AF motor 6 to shift the lens 1. The computer 10 is further arranged to produce diaphragm driving information according to the control data. The information is converted into an analog value by the D/A converter 5. The analog value output of the converter 5 is supplied to the driver 4 to cause the aperture position of the diaphragm 2 to be controlled through the actuator 3 accordingly.

The state of the lens which varies under the above-stated control is detected by the encoders 8. The result of detection is supplied to the microcomputer 10.

The arrangement of the camera system on the side of the camera body CU is as follows: An image sensor 11 is arranged to photo-electrically convert an object's image formed through the photo-taking lens 1 and produce a video signal as a result of the conversion. A camera signal processing circuit 12 is arranged to perform a gamma correction process, etc., on the video signal output from the image sensor 11 and to separate it into a luminance signal Y and a color-difference signal C. A camera encoder circuit 13 is arranged to receive the luminance signal Y and the color-difference signal C from the camera signal processing circuit 12 and to convert them into a TV signal of the NTSC, PAL or SECAM system or the like. An automatic exposure control (AE) circuit 14 consists of an integrator 15 and an A/D converter 16. The AE circuit 14 is arranged to receive from the camera signal processing circuit 12 a linear luminance signal Y' which is not gamma-corrected; to integrate the signal Y' for one field period, i.e., one picture amount of the signal Y', by means of the integrator 15; to convert it into a digital signal by means of the A/D converter 16; and to supply the digital signal to a camera controlling microcomputer 21 (hereinafter referred to as camera microcomputer).

An automatic focus detecting (AF) circuit 17 consists of a focus detecting circuit 18 which is arranged to detect the focused degree of the lens on the basis of the amount of a high-frequency component extracted by a high-pass filter (not shown) from the linear luminance signal Y' output from the camera signal processing circuit 12; an A/D converter 19; and a focus detecting microcomputer 20 (hereinafter referred to as AF microcomputer) which is arranged to detect the focused degree on the basis of the output of the A/D converter 19 and to supply the result of focus detection to the camera microcomputer 21.

The camera microcomputer 21 controls the camera and is arranged to obtain exposure control data and focus data from the AE circuit 14 and the AF circuit 17; to compute and obtain control data for the lens unit side; and to supply the lens control data to the lens unit LU through a communication line 22 formed by the electric contacts of the mount part M.

The video signal obtained from the image sensor 11 is divided by the camera signal processing circuit 12 into a gamma-corrected luminance signal Y and a color-difference signal C. After that, these signals are converted by the camera encoder circuit 13 into a TV signal in conformity to the NTSC, PAL or SECAM system or the like. Meanwhile, a linear luminance signal Y' which has not been gamma-corrected by the camera signal processing circuit 12 is supplied to both the AE circuit 14 and the AF circuit 17. At the AE circuit 14, one field amount, i.e., one picture amount, of the luminance signal is integrated, A/D converted and sent to the camera microcomputer 21. The A/D converted value of the luminance signal is compared within the camera microcomputer 21 with a value predetermined for an apposite exposure. Information or data on a difference between these values found as a result of comparison is serially sent to the lens microcomputer 10 via contacts which are not shown but are provided between the camera body CU and the lens unit LU. At the lens microcomputer 10, the value of this difference is D/A converted. The driver 4 is controlled and the diaphragm actuator 3 is driven according to the difference value. The aperture area of the diaphragm 2 is changed for an apposite exposure. An AE (automatic exposure) control action is thus performed in a closed loop manner. The field frequency of the NTSC system is 60 Hz while those of the PAL and AECAM systems are 50 Hz. Therefore, in this instance, the integrating cycle of the integrator 15 is arranged to be 60 Hz for the NTSC system or to be 50 Hz for the PAL or SECAM system. The delay time of the AE control system, therefore, varies accordingly. The camera microcomputer 21 performs the AE control by communicating once per field with the lens microcomputer 10 in synchronism with the field frequency of the camera. Accordingly, the instruction cycle of the AE control system is 60 Hz in the case of the NTSC system or 50 Hz in the case of the PAL or AECAM system. Parameters within the control system vary accordingly. Generally, the integrating time constant of the AE control is large and brings about no serious problem. However, in the event of a small aperture, it influences the hunting characteristic of the motor and thus necessitates some changes in the characteristic of an antihunting low-pass filter, as will be described in detail later.

The AF control is described as follows: The AF control is performed in accordance with a so-called hill climbing method which uses the video signal. The luminance signal Y' output from the camera signal processing circuit 12 is used in controlling the lens position in a hill climbing manner by means of a high-pass filter, etc. (not shown) in such a way as to have a high-frequency component of the luminance signal obtained in a maximum quantity. Since this method is well known, the details of it are omitted from the description herein. In accordance with this method, the focus detecting circuit 18 detects a signal (AF signal) which corresponds to the focused state of the lens obtained for every field of the video camera. This signal is A/D converted and is then taken into an AF microcomputer 20.

The AF microcomputer 20 serially communicates with the lens microcomputer 10 via the camera microcomputer 21 for the purpose of driving the AF motor 6 in such a way as to increase the above-stated AF signal. Like the communication between the camera microcomputer 21 and the lens microcomputer 10, the communication between AF microcomputer 20 and the camera microcomputer 21 is conducted once per field in synchronism with the field frequency of the video camera. The encoders 8 of varied kinds of the lens unit LU detect and obtain information required in varying the depth of field, the depth of focus, etc., and supply the information or data thus obtained to the AF microcomputer 20 through the serial communication. The encoders are thus used in selecting an apposite speed of the AF motor 6 for the purpose of keeping the system gain unvarying during the hill climbing control process.

FIG. 16 is a timing chart showing the communication of control data conducted through the communication line 22 between the lens unit LU and the camera body CU of the camera system. In FIG. 16, a reference symbol V denotes the vertical sync signal of the TV signal which is handled on the side of the camera body CU. A symbol CTL denotes control data which is sent from the camera microcomputer 21 disposed within the camera body CU to the lens microcomputer 10 disposed within the lens unit LU. A symbol LTC denotes detection data which indicates the lens state and is sent from the lens microcomputer 10 of the lens unit LU to the camera microcomputer 21.

The control data from the camera microcomputer 21 to the lens microcomputer 10 is sent in packets and in the cycle of the vertical sync signal V. In reply to the control data from the camera microcomputer 21, the lens microcomputer 10 sends lens state detection data relative to the control data to the camera microcomputer 21 also in the cycle of the vertical sync signal V. The communication of control data is conducted simultaneously in both ways. However, the reply to the control data form the camera body side is sent in synchronism with a next cycle of the vertical sync signal V because of a length of time required in an actual process. In FIG. 16, arrows show this correlation.

FIG. 17 shows the data arrangement in each packet of the control data CTL to be sent from the camera body side to the lens unit side and the lens state detection data LTC to be sent in reply from the lens unit side to the camera body side. The data CTL consists of parts serially arranged in the following order from its start: A header which is arranged to indicate the beginning of the data; a focus control data (AF data) area; an automatic exposure control data (AE data) area; and a spare data area which is provided for some other control purposes, such as zoom control data in the case of a zoom lens. The data LTC consists of parts serially arranged in the following order, from its start: A header; an encoder data area provided for the shifted position or the like of the photo-taking lens which is obtained by focus adjustment and detected by the encoders 8; and another encoder data area provided for the area and shifting speed of aperture of the diaphragm 2, etc., detected by the encoders 8.

The communication of control data and lens state detection data between the camera body and the lens unit is conducted, as mentioned above, in synchronism with the field period (vertical sync period) and in packets including the AF and AE data. Therefore, the AF control is closely related to the field frequency. Further, in the case of AF control, the control over the AF motor is also closely related to the field frequency.

These relations are described in the following with reference to FIGS. 18, 19 and 20: FIG. 18 shows the operating principle of the so-called hill climbing method whereby the lens is driven in such a way as to cause the high-frequency component of the luminance signal to be obtained at a maximum level. Assuming that the lens is located at a point A in FIG. 18 when automatic focus adjustment (AF) begins and that the AF motor acts in the defocusing direction, a focus voltage drops according to the direction determining algorithm of the hill climbing method as well known. Therefore, the rotating direction of the AF motor is promptly corrected. The motor is driven in the reverse direction. When the lens position is brought by the action of the AF detecting circuit closer to an in-focus position, the motor speed is changed from a high speed to a low speed at another point B which is near to the in-focus point located at the peak of the hill. The motor speed reduction is effected for preventing hunting at the in-focus point. Next, when the lens position comes down from the peak of the hill by passing a point C (in-focus point) to a slight extent, the AF detecting circuit detects this. The lens is then brought to a stop in the in-focus point by shifting backward to a degree corresponding the peak overpassing extent.

The speed of the AF motor 6 which is disposed within the lens unit LU is controlled as follows:

A PWM (pulse width modulation) control method is generally employed for controlling the speed of the AF motor, because, when compared with the method of controlling the motor speed by changing a voltage applied to the motor, the PWM method gives a higher motor starting torque even in the event of a low speed. Hence, the PWM method is considered to be advantageous with respect to reduction in size of the motor and power consumption.

As shown in FIG. 19, the AF motor control cycle, i.e., the PWM control cycle, coincides with the field cycle of the video camera in general. Hence, it is 1/60 second in the case of the NTSC system. To obtain a motor speed as desired, the on-time T (see FIG. 19) of the PWM control is stored by the software of the lens microcomputer 10. When an instruction for a low speed is sent from the AF microcomputer 20 via the camera microcomputer 21 to the lens microcomputer 10, the lens microcomputer 10 causes the AF motor to be driven under the PWM control which is arranged to remain in an on-state for the period of time T. High and low speeds are set in such a way as to make the system gain of the hill climbing action unvarying according to the outputs of the various encoders 8. In other words, the period of time T of FIG. 19 varies according to the focal length and the aperture value.

In a case where the lens unit is mounted on a camera body conforming to the PAL or SECAM system instead of the NTSC system, the cycle of the PWM control becomes 1/50 sec as shown in FIG. 20. If the period of time (on-time) T is set at the same value as in the case of the NTSC system, the motor speed becomes slower by about 20%. This causes a change in the focus adjustment driving state to lower the focusing speed and also deteriorates the accuracy of the focusing action. In other words, the speed control for the purpose of preventing hunting at the in-focus point turns out in actuality to be a 20% setting miss of the AF motor speed. This brings about a grave problem in terms of speed control characteristics.

To solve this problem, therefore, the TV system is detected on the side of the lens unit by detecting the packet cycle (vertical sync period V) of the control data received from the camera body. Then, the AF motor speed control algorithm is changed over to an algorithm adapted to the TV system detected. This arrangement enables the embodiment to keep the characteristic of the AF motor speed control unvarying despite of the difference in the control data communication cycle. More specifically, the pulse width (or on-time) T of the motor driving pulse signal is multiplied by 60/50 to make it into a width T'. This gives the same AF motor driving speed as the speed obtained in the case of the NTSC system.

Figure 21:
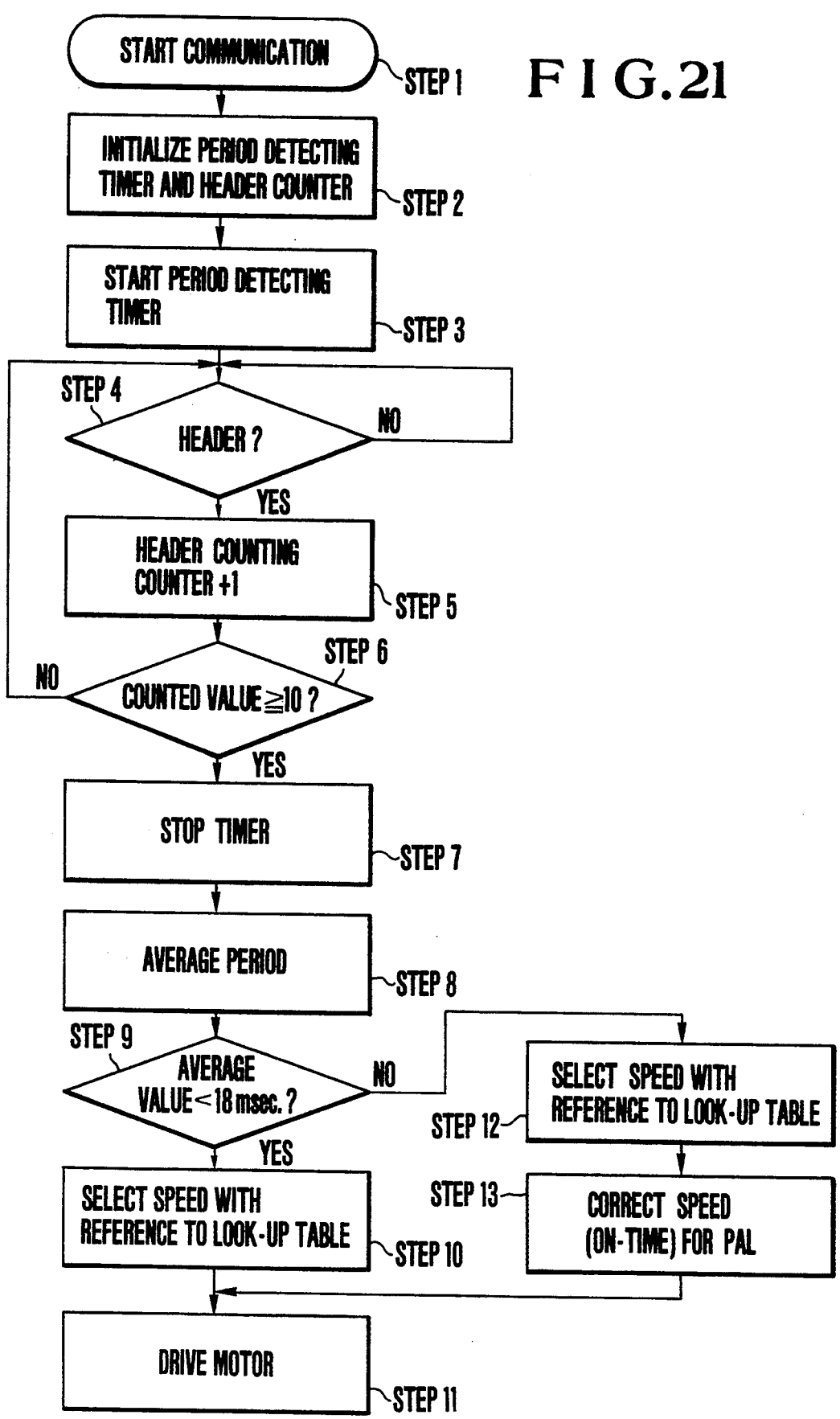
FIG. 21 is a flow chart showing a control algorithm arranged in accordance with this invention.
Figures 22, 23:
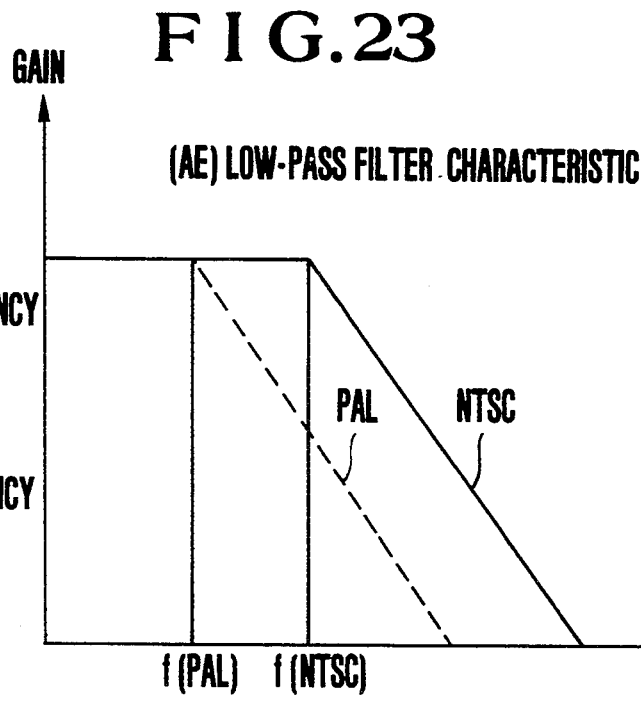
FIG. 22 is a look-up table provided for speed control data.
FIG. 23 shows an AE (automatic exposure) control performed in accordance with this invention.

FIG. 21 is a flow chart showing the above-stated control algorithm. The basic steps of the algorithm are as follows: Step 1: The communication begins with the lens unit LU mounted on the camera body CU. Step 2: A timer which is formed by the software within the lens microcomputer for the purpose of detecting the packet communication cycle and a counter which is also formed within the lens microcomputer for the purpose of counting headers are initialized. Step 3: The timer is started. Steps 4 and 5: The counted value of the counter is incremented by one every time the header information pattern of the packet transmitted is detected. Step 6: A check is made to see if the number of headers detected, i.e., the number of packets received, has reached 10 or more. If not, the flow comes back to the step 4. If so, the flow comes to a step 7. Step 7: The timer is brought to a stop. Step 8: The timer operating time is averaged by averaging the periods of 10 packets to find the time of one cycle. Step 9: A check is made to see if the time of one cycle is less than 18 msec. Step 10: If the time of one cycle is found to be less than 18 msec, the flow comes to the AF motor speed control algorithm suited to the vertical sync period V of the NTSC system. A speed corresponding to the control data received from the camera body is selected from a look-up table in which a plurality of speed control values are stored for driving the AF motor. Step 11: The AF motor is driven accordingly. The above-stated look-up table is arranged as shown in FIG. 22. Referring to FIG. 22, the control data from the camera microcomputer includes, for example, a total of 16 stepped values of AF motor speed data V1 to V16. A plurality (16) of speed control values, i.e., the pulse width (or on-time) of the motor driving signal which correspond respectively to these motor speed data V1 to V16 are stored in the look-up table. The arrangement which is thus made on the side of the lens unit enables the camera body side to designate a lens driving speed by simply transmitting the AF speed data V1 to V16 to the lens unit.

Further, if the time of one cycle is found to exceed 18 msec at the step 9, the flow comes to a step 12 provided for an AF motor speed control algorithm which is adapted for the vertical sync period V of the PAL system. At the step 12: A speed control value which corresponds to the control data sent from the camera body side is selected with reference to the above-stated look-up table of the AF motor speed control values. At a step 13: The speed value selected at the step 12 is corrected into a value apposite to the PAL system. After that, the flow comes to a step 11 to have the AF motor driven accordingly. The value of time 18 msec is a threshold value set in consideration of that the vertical sync period V of the NTSC system is 16.7 msec and that of the PAL system is 20 msec.

In other words, the lens microcomputer is arranged to count a length of time required in conducting the communication ten times (cycles) including the initializing action. A check is made to find whether the averaged value of one cycle of communication is 1/60 sec or 1/50 sec. The average value is 1/60 sec in the case of the NTSC system and 1/50 sec in the case of the PAL or SECAM system. One of different algorithms which is adapted for the applicable TV system is selected and executed by the lens microcomputer.

A practicable example of AF motor speed control is described as follows: In the case of the NTSC system, the on-time of the PWM control over the AF motor is set at a length of time T. In the event of the PAL or SECAM system which has the vertical sync period of 1/50 sec, the on-time of the PWM control over the AF motor is set at T' as shown in FIG. 20. In the PAL system, the vertical sync period is longer than the NTSC system. Therefore, correction is made to increase the motor driving pulse width in such a way as to obtain the same speed both for the two different TV systems. In an actual application, the driving pulse width of the PAL system is corrected by multiplying that of the NTSC system by 60/50.

In the case of the embodiment described above, the lens microcomputer is arranged to automatically detect the TV system employed by statistically measuring the packet transmission cycle. However, this arrangement may be changed to send the information about the TV system by using the spare area available within the packet.

While the embodiment has been described as arranged to detect the TV system through the packet transmission cycle, the TV system can be detected also by setting a TV system identification flag, as mentioned above, in the spare area which is provided within the control data as shown in FIG. 17 and by detecting this flag on the side of the lens unit. Then, one of the AF motor driving algorithms adapted for the different TV systems can be selected as shown in FIG. 21. This simplifies the above-stated TV system detecting algorithm which uses the vertical sync period V.

In the case of AE control, a difference in instruction cycle among TV cameras also brings about a difference in the response characteristic. The problem of hunting arises, especially in the event of a small, stopped-down aperture which gives a deep depth of field. To prevent hunting in controlling the diaphragm actuator 3, the AE control signal passes through a low-pass filter of a characteristic as shown in FIG. 23 when the diaphragm is found to have been stopped down to a small aperture. The low-pass filter is, for example, arranged within the lens microcomputer in the form of a digital filter. Since the AE instruction cycle varies with the TV system, the digital filter is arranged to have two different algorithms, one for the NTSC system and the other for the PAL or SECAM system. In FIG. 23, a reference symbol NTSC denotes a low-pass filter characteristic adapted for the NTSC system and a symbol PAL a characteristic adapted for the PAL or SECAM system. In the event of the PAL or SECAM system, the cut-off frequency of the filter is lowered according to the difference in transmission cycle from the NTSC system, so that the hunting preventing effect also can be attained in the same manner as in the case of the NTSC system.

In controlling a zoom lens, a change in characteristic due to the difference in the control data transmission cycle also occurs. Therefore, this invention is of course likewise applicable to a control arrangement for a zoom lens.

In the camera system according to this invention, as described in the foregoing, the TV system employed on the side of the camera body is detected on the side of the lens unit; and an applicable driving algorithm is selected from among different algorithms provided on the side of the lens unit according to the TV system detected. The lens, therefore, can be driven at a given speed irrespectively of the signal processing method employed on the side of the camera body. In accordance with this invention, therefore, deterioration in characteristic, a faulty action, etc., due to a discrepancy in signal processing method between the camera body and the lens unit can be effectively prevented.

The camera system arrangement according to this invention thus enables the lens unit to have a perfect interchangeability among camera systems of different signal processing methods. The invented interchangeable lens system, therefore, can be used for all the TV cameras of the world in common with each other.

What is claimed is:

1. A lens unit for use with a camera which provides a driving control signal having a predetermined periodicity, said lens unit comprising:
   a) a driving part which varies a condition of an optical system of said lens unit;
   b) an actuator for driving said driving part; and
   c) driving control means for driving said actuator on the basis of receiving said driving control signal, said driving control means supplying a driving signal to said actuator in a periodicity different from said predetermined periodicity, the driving control signal coming from said camera side being asynchronous with said driving signal.

2. A lens unit according to claim 1, wherein said condition is a focal condition and wherein said driving part varies an image forming position of said optical system by driving a focusing lens to adjust focus of said optical system.

3. A lens unit according to claim 1 or 2 wherein said driving control means receives said drive control signal in a periodicity of a vertical synchronizing signal of a TV signal processed in said camera.

4. A lens unit according to claim 3, wherein said driving control signal indicates information on a driving speed and a driving direction of said actuator, wherein said driving control means is arranged to supply said driving signal in accordance with said information.

5. A lens unit according to claim 4, wherein said driving control means includes a microcomputer receiving said driving control signal and providing said driving signal to said actuator.

6. A lens unit according to claim 5, wherein said microcomputer sets a program providing an execution repeating cycle for generating said actuator driving signal at a periodicity which differs from the periodicity of said vertical synchronizing signal of said TV signal being processed in said camera.

7. A lens unit according to claim 1 or 2, wherein said actuator is a stepper motor.

8. A lens unit according to claim 1, wherein said lens unit is detachably mountable on a camera, and wherein said driving control means is provided with communication means for communication of information with said camera in a periodicity which is synchronized with the periodicity of a vertical synchronizing signal of a TV signal processed in said camera.

9. A lens unit which is detachably mountable on a camera which provides a driving control signal having a predetermined periodicity, said lens unit comprising:
   a) a driving part which varies a condition of an optical system of said lens unit;
   b) an actuator for driving said driving part; and
   c) driving control means for supplying a driving signal to said actuator in a further periodicity on the basis of receiving said driving control signal from said camera, said driving control means being operative to change a driving state of said actuator at an end of one cycle of said driving control signal.

10. A lens unit according to claim 9, wherein said driving part is operative to change an image forming position of said optical system to adjust focus of said optical system, and wherein said actuator is a stepper motor which drives a focusing lens included in said optical system.

11. A lens unit according to claim 9 or 10, wherein said driving control means receives said drive control signal in a periodicity of a vertical synchronizing signal of a TV signal processed in said camera.

12. A lens unit according to claim 11, wherein said driving control signal indicates information on a driving speed and a driving direction of said actuator, and wherein said driving control means supplies said driving signal to said actuator in accordance with said information.

13. A lens unit according to claim 12, wherein said driving control means includes a microcomputer receiving said driving control signal and providing said driving signal to said actuator.

14. A lens unit according to claim 13, wherein said microcomputer sets a program providing an execution repeating cycle for generating said actuator driving signal at a periodicity which differs from the periodicity of said vertical synchronizing signal of said TV signal being processed in said camera.

15. A lens unit according to claim 9, wherein said driving control means changes a driving state of said actuator even before the end of a driving cycle of said actuator if the content of said driving control signal currently received from said camera differs from that of the driving control signal previously received.

16. A lens unit according to claim 15, wherein said driving control means is arranged to reverse the driving direction of said actuator even before the end of a driving cycle of said actuator when a signal indicating a change in the driving direction of said actuator is received from said camera.

17. A lens unit according to claim 16, wherein the driving periodicity of said actuator is set by a timer.

18. A lens unit detachably mountable on a body of a camera which provides a control information signal, said lens unit comprising:
   a) driving means for varying an optical characteristic of said lens unit;
   b) control means for receiving said control information signal and discriminating a characteristic of said camera according to said control information signal and for changing a driving characteristic of said driving means according to the result of the discrimination.

19. A lens unit according to claim 18, wherein said control means has a memory for storing driving information for said driving means and controls said driving means by selecting driving information from the contents of said memory in accordance with said control information signal.

20. A lens unit according to claim 19, wherein said driving information relates to a driving speed to be employed by said driving means.

21. A lens unit according to claim 19 or 20, wherein said driving means includes a motor which is arranged to vary said optical characteristic, and wherein said motor is controlled by a pulse width modulation (PWM) signal on the basis of said control information signal and in synchronism with the periodicity of said control information signal.

22. A lens unit according to claim 21, wherein said control means is arranged to control an on-period of said PWM signal in accordance with a characteristic of said control information signal.

23. A lens unit according to claim 22, wherein the characteristic of said control information signal is a vertical synchronizing signal frequency conforming to a TV signal system employed by said camera body, and wherein said control means is operative to discriminate the periodicity of said control information signal transmitted from said camera body.

24. A lens unit according to claim 23, wherein said driving means adjusts focus of said optical system.

25. A lens unit according to claim 22, wherein the characteristic of said control information signal is a vertical synchronizing signal frequency conforming to a TV signal system employed by said camera body.

26. A lens unit according to claim 18, wherein said driving means adjusts exposure of said optical system.

27. A camera having a lens unit detachably mounted thereon, comprising:
   a) driving means arranged to vary an operating state of said lens unit; and
   b) control means for generating control information for controlling said driving means and for transmitting to said driving means said control information by adding thereto identifying information which indicates a signal processing method employed by said camera, said control means being arranged to transmit said control information to said lens unit at a predetermined period according to said signal processing method.

28. A camera according to claim 27, wherein said control means is provided with a memory for storing driving information for said driving means and is arranged to control said driving means by selecting driving information for said driving means from among the contents of said memory according to said control information.

29. A camera according to claim 28, wherein said driving information indicates a driving speed to be employed by said driving means.

30. A camera according to claim 29, wherein said driving means includes a motor for varying an optical characteristic of said lens unit and is arranged to control said motor by a pulse width modulation (PWM) signal on the basis of said control information and in synchronism with the periodicity of said control information signal.

31. A camera according to claim 30, wherein said control means is arranged to control an on-period of said PWM signal in accordance with a characteristic of said control information signal.

32. A camera according to claim 31, wherein said identifying information indicates a vertical synchronizing signal frequency of a TV signal system employed by said camera.

33. A camera according to claim 32, wherein said control means is operative to transmit said control information in synchronism with the vertical synchronizing signal frequency of a TV signal employed by said camera.

34. A camera according to claim 33, wherein said driving means adjusts focus of said lens unit.

35. A camera according to claim 27, wherein said driving means adjusts exposure of said lens unit.

36. A camera according to claim 35, wherein said driving means includes an integrating circuit which integrates an image signal in a predetermined periodicity to detect the quantity of incident light, and wherein said control means is arranged to vary a cut-off frequency of said integrating circuit in accordance with a discrimination made by discriminating means.

37. A camera according to claim 36, wherein said control means discriminates the periodicity of a vertical synchronizing signal of a TV signal processed in said camera and is operative to transmit said control information in synchronism with the periodicity of said vertical synchronizing signal.

38. A camera system having a camera body and a lens unit which is detachably mountable on said camera body, comprising:
   a) driving means for varying the state of an optical system of said lens unit;
   b) transmission means for transmitting, from said camera body to said lens unit, driving information required for varying a state of said optical system and identifying information corresponding to a signal processing method employed in said camera body; and
   c) control means for controlling and varying an operating state of said optical system of said lens unit on the basis of said driving information and to vary a control characteristic of said driving means on the basis of said identifying information.

39. A camera system according to claim 38, wherein said transmission means is arranged to transmit said information in synchronism with a vertical synchronizing signal frequency of a TV signal processed in said camera body.

40. A camera system according to claim 39, wherein said identifying information is a signal indicating the vertical synchronizing signal frequency of said TV signal.

41. A camera system according to claim 40, wherein said driving means adjusts focus of said lens unit, and wherein said control means controls a driving speed of said driving means according to said identifying information.

42. A system according to claim 40, wherein said driving means adjusts exposure of said lens unit, and wherein said control means controls, according to said identifying information, a time constant of an integrating means for detecting the quantity of incident light.

* * * * *

UNITED STATES PATENT AND TRADEMARK OFFICE
CERTIFICATE OF CORRECTION

PATENT NO. : 5,387,960

DATED : February 7, 1995    Page 1 of 3

INVENTOR(S) : Masahide Hirasawa et al.

It is certified that error appears in the above-identified patent and that said Letters Patent is hereby corrected as shown below:

Col. 2, line 14.  Delete ":" and change "A" to -- a --.

Col. 3, line 46.  Change "of" to -- to --.

Col. 4, line 55.  Change "wherein:" to -- wherein --.

Col. 4, line 59.  Change "irrespectively" to -- irrespective --.

Col. 5, line 11.  Change "comprises:" to -- comprises --.

Col. 5, line 34.  Change "comprises:" to -- comprises --.

Col. 5, line 63.  After "in" insert -- the --.

Col. 6, line 14.  Change "Fig. 7 is" to -- Figs 7(a)-(f) depict --.

Col. 6, line 29.  Change "Fig. 16 is" to -- Figs. 16(a)-16(c) depict --.

Col. 6, line 32.  Change "Fig. 17 shows" to -- Figs. 17(a)-(c) show --.

Col. 6, line 37.  Change "Figs. 19 and 20" to -- Figs. 19(a)-(b) and 20(a)-(b) --.

Col. 8, line 61.  Change "Fig. 7" to -- Figs. 7(a)-(f) --.

Col. 12, line 8.  After "responded" insert -- to --.

Col. 12, line 17.  Change "When" to -- when --.

Col. 16, line 33.  Change "The" to -- the --.

UNITED STATES PATENT AND TRADEMARK OFFICE
CERTIFICATE OF CORRECTION

PATENT NO. : 5,387,960

DATED : February 7, 1995

INVENTOR(S) : Masahide Hirasawa et al.

It is certified that error appears in the above-identified patent and that said Letters Patent is hereby corrected as shown below:

Col. 16, line 65.  Change "Fig. 16 is" to -- Figs. 16(a)-(c) depict --.

Col. 17, line 22.  Change "Fig. 16" to -- Figs. 16(b) and (c), --.

Col. 17, line 28.  Change "A" to -- a --.

Col. 17, line 35.  Change "A" to -- a --.

Col. 17, line 51.  Change "19 and 20:" to -- 19(a)-(b) and 20(a)-(b): --.

Col. 17, line 60.  After "as" insert -- is --.

Col. 18, line 18.  Change "Fig. 19" to -- Figs. 19(a)-(b) --.

Col. 18, line 33.  Delete "of Fig. 19".

Col. 18, line 38.  Change "Fig. 20" to -- Figs. 20(a)-(b) --.

Col. 18, line 56.  Delete "of".

Col. 19, line 46.  Delete "of".

Col. 19, line 60.  Change "In" to -- in --.

Col. 20, line 1.  Change "both for" to -- for both --.

Col. 20, line 59.  Change "irrespectively" to -- irrespective --.

UNITED STATES PATENT AND TRADEMARK OFFICE
CERTIFICATE OF CORRECTION

PATENT NO. : 5,387,960

DATED : February 7, 1995

INVENTOR(S) : Masahide Hirasawa et al.

It is certified that error appears in the above-identified patent and that said Letters Patent is hereby corrected as shown below:

Col. 21, line 29. After "actuator," insert -- and --.

Signed and Sealed this

Sixth Day of June, 1995

*Attest:*

BRUCE LEHMAN

*Attesting Officer*      Commissioner of Patents and Trademarks